(12) United States Patent
Jang

(10) Patent No.: US 11,734,637 B2
(45) Date of Patent: Aug. 22, 2023

(54) MANAGEMENT SYSTEM USING BEHAVIOR PATTERN RECOGNITION

(71) Applicant: Bong Seok Jang, Jeonju-si (KR)

(72) Inventor: Bong Seok Jang, Jeonju-si (KR)

(73) Assignee: Bong Seok Jang, Jeonju-si (KR)

( * ) Notice: Subject to any disclaimer, the term of this patent is extended or adjusted under 35 U.S.C. 154(b) by 21 days.

(21) Appl. No.: 17/233,120

(22) Filed: Apr. 16, 2021

(65) Prior Publication Data

US 2021/0256450 A1 Aug. 19, 2021

Related U.S. Application Data

(63) Continuation-in-part of application No. PCT/KR2019/013536, filed on Oct. 15, 2019.

(30) Foreign Application Priority Data

Oct. 16, 2018 (KR) ........................ 10-2018-0123100

(51) Int. Cl.
*G06Q 10/0639* (2023.01)
*G06V 40/20* (2022.01)

(52) U.S. Cl.
CPC .  *G06Q 10/06395* (2013.01); *G06Q 10/06398* (2013.01); *G06V 40/20* (2022.01)

(58) Field of Classification Search
None
See application file for complete search history.

(56) References Cited

U.S. PATENT DOCUMENTS

| 8,680,995 B2 * | 3/2014 | G | G07C 9/30 340/5.31 |
| 10,346,905 B1 * | 7/2019 | Chang | G06Q 40/00 |
| 2009/0195394 A1 * | 8/2009 | Johnson | H04M 1/18 340/584 |
| 2010/0161706 A1 * | 6/2010 | Kim | G05B 15/02 706/54 |

(Continued)

FOREIGN PATENT DOCUMENTS

| AU | 2013205245 A1 * | 10/2013 | G06K 19/0723 |
| JP | 2010224879 A * | 10/2010 | |

(Continued)

OTHER PUBLICATIONS

Song, Jiqiang, Eugene Y. Tang, and Leibo Liu. "User behavior pattern analysis and prediction based on mobile phone sensors." IFIP International Conference on Network and Parallel Computing. Springer, Berlin, Heidelberg, 2010. (Year: 2010).*

(Continued)

*Primary Examiner* — Thomas L Mansfield
(74) *Attorney, Agent, or Firm* — NKL Law; Jae Youn Kim

(57) ABSTRACT

A management system using behavior pattern recognition according to the present disclosure includes a user-behavior measurement unit configured to continuously detect a behavior of a user; a system server connected to the user-behavior measurement unit and configured to analyze and pattern the behavior of the user; and a manager terminal configured to receive and monitor behavior pattern information of the user generated by the system server, where the user is a worker, and the user-behavior measurement unit receives the behavior of the user from a sensor or a user terminal.

10 Claims, 20 Drawing Sheets

(56) References Cited

U.S. PATENT DOCUMENTS

| | | | | |
|---|---|---|---|---|
| 2015/0313529 A1* | 11/2015 | Nevo | .................... | A61B 5/165 |
| | | | | 600/595 |
| 2016/0139692 A1* | 5/2016 | Glazer | .................... | G06F 3/038 |
| | | | | 345/163 |
| 2016/0224836 A1* | 8/2016 | Appel | .................... | G06V 40/20 |
| 2016/0239168 A1* | 8/2016 | Glazer | ................. | G06F 1/1694 |
| 2017/0207926 A1* | 7/2017 | Gil | ........................ | G06Q 10/20 |
| 2018/0196865 A1* | 7/2018 | Rabin | ...................... | G06F 9/54 |
| 2021/0183522 A1* | 6/2021 | Lintereur | ............ | G06K 9/6292 |

FOREIGN PATENT DOCUMENTS

| | | |
|---|---|---|
| JP | 2013-218699 A | 10/2013 |
| KR | 10-0710317 B1 | 4/2007 |
| KR | 10-0942828 B1 | 2/2010 |
| KR | 10-2010-0073802 A | 7/2010 |
| KR | 10-2012-0047710 A | 5/2012 |
| KR | 10-2014-0088667 A | 7/2014 |
| KR | 10-1609533 B1 | 4/2016 |
| KR | 10-1619419 B1 | 5/2016 |
| KR | 10-2018-0057368 A | 5/2018 |
| KR | 10-1944100 B1 | 1/2019 |

OTHER PUBLICATIONS

Wang, Yingjie, et al. "The truthful evolution and incentive for large-scale mobile crowd sensing networks." IEEE Access 6 (2018): 51187-51199. (Year: 2018).*

* cited by examiner

MANAGEMENT SYSTEM USING BEHAVIOR PATTERN RECOGNITION

CROSS-REFERENCE TO RELATED APPLICATIONS

This application is a continuation-in-part application of PCT international application No. PCT/KR2019/013536 filed on Oct. 15, 2019, and claims priority to Korean patent application No. 10-2018-0123100 filed on Oct. 16, 2018, and the entire disclosures of these applications are incorporated by reference herein.

TECHNICAL FIELD

The present disclosure relates to a management system using behavior pattern recognition, and more particularly, to a management system that analyzes, individualizes, and categorizes daily life, social welfare, medical care, general administration performed by the institution, office work or behaviors related to workers, and users' daily behavior, and that uses automated behavior pattern recognition by organically combining cycles, performance capabilities, whether or not assistance is needed, expenses, fees (billing), and so on.

BACKGROUND ART

As an example of one of conventional management systems, a conventional form of performing office work related to conventional social security and social welfare has an inconvenience in that, even when a computer system is connected thereto, a person has to plan the work to be done, do the work according to the plan, and record the work in a computer system.

Accordingly, inaccurate records or falsely written cases by others cannot be known, which may lead to unnecessary tax waste. In addition, there is a problem of unnecessary time and expense that may be wasted because it is not possible to accurately check a user's condition or desire, degree, provision time, cycle, and so on, when a service is provided to the user.

In addition, when a user needs someone's help in living daily life, the conventional management system has a problem in that other persons have to individually check and plan to provide a service.

In addition, the conventional management system related to social security and social welfare have been produced and used in a fragmentary and sporadic way. For example, various social welfare programs or medical-related programs in the current market, safety management systems for elderly persons living alone, life care systems, remote management systems using life patterns for elderly persons living alone, and so on, are fragmentary or safety management systems in the context of a crisis situation for users.

That is, it is necessary to develop a platform for not only completely solving the above-described problems, but also connecting, controlling, supporting, and managing all parties, all institutions, all works, all expenses, and so on related to social security and social welfare with a single system.

SUMMARY OF INVENTION

Technical Problem

An object of an embodiment of the present disclosure is to provide a management system that analyzes, individualizes, and categorizes daily life, social welfare, medical care, general administration performed by the institution, office work or behaviors related to workers, and users' daily behavior, and that uses automated behavior pattern recognition by organically combining cycles, performance capabilities, whether or not assistance is needed, expenses, fees (billing), and so on.

Solution to Problem

According to the present disclosure, a management system using behavior pattern recognition includes a user-behavior measurement unit configured to continuously detect a behavior of a user; a system server connected to the user-behavior measurement unit to analyze and pattern the behavior of the user; and a manager terminal that receives and monitors behavior pattern information of the user generated by the system server, and the user may be a worker, and the user-behavior measurement unit may receive the behavior of the user from a sensor or a user terminal.

In addition, the management system may further include an applicant-only behavior measurement unit for detecting a behavior of a management applicant that applies for management in connection with the user, and the applicant-only behavior measurement unit may receive the behavior of the user from a sensor or an applicant terminal.

In addition, the system server may include a pattern analysis unit that performs analysis to be patterned in connection with the user-behavior measurement unit and the applicant-only behavior measurement unit; a setting unit that automatically or manually sets expense (fee) for each behavior; a notification unit that notifies the user terminal, the applicant terminal, and the manager terminal of the behaviors of the user and the management applicant when values measured by the user-behavior measurement unit and the applicant-only behavior measurement unit do not match a set value of the setting unit; and a financial accounting unit that processes the expense according to the behavior of the user and transmits expense processing information to the manager terminal or the user terminal.

In addition, the system server may include an estimation unit that extracts predicted estimation before being matched with the user by measuring the behavior of the management applicant for a certain period of time by using the user-behavior measurement unit and transmits the predicted estimation to the manager terminal and the management applicant terminal.

In addition, the system server may further include a matching unit that compares and connects a behavior pattern of the user and a behavior pattern of the management applicant with each other, which are collected by measuring the behaviors of the user and the management applicant by using the user-behavior measurement unit and the applicant-only behavior measurement unit, respectively.

In addition, the system server may further include a payment unit that converts payment information into data and transmit the data to the manager terminal when the payment information on a payment card registered by the user is inputted.

In addition, the system server may further include a payment tracking unit that performs tracking to prevent an abuse of payment.

In addition, the payment tracking unit may compare a behavior pattern of the management applicant measured by an applicant-only behavior pattern unit with a behavior pattern of the user measured by a user-behavior pattern unit to determine the abuse when the payment information on the payment card registered by the user connected to the management applicant is inputted.

In addition, the payment tracking unit may compare a behavior pattern of the user measured and collected by a user-behavior pattern unit with a behavior pattern of the user at a time of payment to determine the abuse when the payment information on the payment card registered by the user who is not connected to the management applicant is inputted.

In addition, the system server may further include a feedback unit that transmits abuse details to the manager terminal when the abuse of payment is detected by the payment tracking unit and that receives action information from the manager terminal and transmits the action information to the user terminal.

Advantageous Effects

According to the present disclosure, a management system using behavior pattern recognition may notify future tasks through various terminals (a mobile terminal, an artificial intelligence speaker, a smart TV, a robot, and so on) when only an initial condition is set.

In addition, possibility for each behavior may be accurately measured by checking a condition of a user, and thus, necessary social welfare or work instructions may be provided quickly.

In addition, a manager in a managing position may reduce the amount of work through automatically processed documents and save time required for the work, and thus, work efficiency may be increased.

DETAILED DESCRIPTION OF EMBODIMENTS

Figure 1:
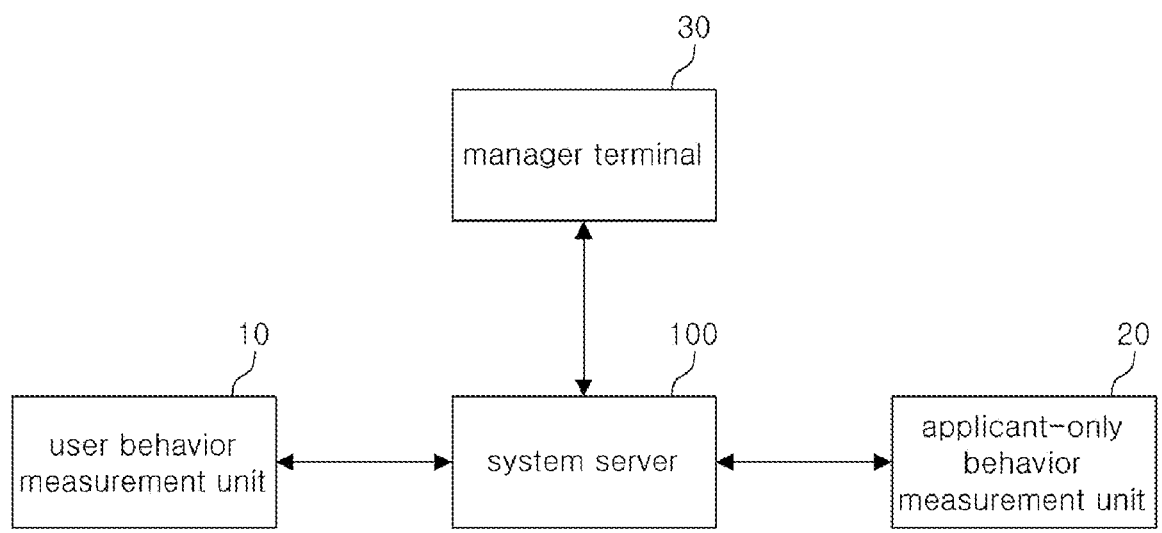
FIG. 1 is a block diagram of a management system using behavior pattern recognition according to an embodiment of the present disclosure.

Hereinafter, description of the present disclosure with reference to the drawings is not limited to a specific embodiment, and various modifications may be made and various embodiments may be provided. In addition, content to be described below should be understood to include all conversions, equivalents, and substitutes included in the idea and scope of the present disclosure.

In the following description, terms such as "first" and "second" are used to describe various components, and meanings thereof are not limited and are used only for the purpose of distinguishing one component from other components.

The same reference numerals used throughout this specification denote the same elements.

Singular expressions used in the present disclosure include plural expressions unless the context clearly indicates otherwise. In addition, terms such as "comprise", "include", and "have" to be described below are intended to designate the presence of features, numbers, steps, operations, configuration elements, components, and combinations thereof described in the specification, and it should be understood that possibility of presence or addition of one or more other features, numbers, steps, operations, configuration elements, components, or combinations thereof is not preliminarily excluded.

Unless otherwise defined, all terms including technical or scientific terms used herein have the same meaning as commonly understood by those skilled in the art to which the present disclosure belongs. Terms as defined in a commonly used dictionary should be interpreted as having a meaning consistent with the meaning in the context of the related technology and should not be interpreted as an ideal or excessively formal meaning unless explicitly defined in the present application.

The term "unit" is defined herein as having its broadest definition to an ordinary skill in the art to refer to a software including instructions executable in a non-transitory computer readable medium that would perform the associated function when executed, a circuit and/or a processor designed to perform the associated function, a hardware designed to perform the associated function, or a combination of a software, a circuit, or a hardware designed to perform the associated function.

Further, it is to be understood that all detailed descriptions mentioning specific embodiments of the present disclosure as well as principles, aspects, and embodiments of the present disclosure are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that, for example, block diagrams of the present specification illustrate a conceptual aspect of an illustrative circuit for embodying a principle of the present disclosure. Therefore, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute software in connection with appropriate software as well as dedicated hardware. When the functions are provided by the processors, they may be provided by a single dedicated processor, a single shared processor, or a plurality of individual processors, and some of them may be shared with each other.

In addition, the explicit use of terms presented as the processor, control, or similar concepts should not be interpreted exclusively by quoting hardware capable of executing software, but should be understood to implicitly include, without limitation, digital signal processor (DSP) hardware, a ROM for storing software, a RAM, and a non-volatile memory.

The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a method demanded by the claims in the present disclosure defined by the claims, any means capable of providing these functions are equivalent to means recognized from the present specification.

In addition, in the description with reference to the accompanying drawings, the same reference numerals are assigned to the same components regardless of the reference numerals of the drawings, and redundant descriptions thereof will be omitted. In describing the present disclosure, when it is determined that detailed description of a related known technology may unnecessarily obscure the subject matter of the present disclosure, the detailed description will be omitted.

Hereinafter, embodiments of the present disclosure will be described in detail with reference to accompanying FIGS. 1 and 2.

First, a management system using behavior pattern recognition according to an embodiment of the present disclosure may include a user-behavior measurement unit 10, a system server 100, and a manager terminal 30, and may further include an applicant-only behavior measurement unit 20.

A user may refer to a worker, and a worker may be a teacher, a social worker, or a general office worker, and so on, who is employed by a manager.

That is, the user-behavior measurement unit 10 may measure a behavior with a sensor that may perform measurement according to what kind of work a user does or with a user terminal possessed by the user.

The sensor includes a current sensor, a gas sensor, a camera sensor, an illumination sensor, a heat sensor, a water pressure sensor, a flow amount sensor, and so on, and a value detected by a sensor related to a user's work behavior may be inputted to the system server 100.

The user terminal receives work activity performed by a user from the user in a manner such as a touch and transmits the work activity to the system server 100.

Accordingly, the system server 100 may pattern a user's behavior according to the behavior inputted to the sensor and the user terminal in real time.

In this regard, detailed description will be made while describing a configuration of the system server 100 below.

The manager terminal 30 receives and monitors user behavior pattern information generated by the system server 100 and is possessed by a manager.

That is, the manager may include an employment company that employs the user and may be, for example, a representative or a business manager of an academy, a public institution, a medical institution, or a company.

The applicant-only behavior measurement unit 20 may measure a behavior with a sensor that may perform measurement according to what kind of behavior a management applicant does or with an applicant terminal possessed by the management applicant.

That is, the management applicant is a person who applies for management in connection with a user and may be a student, an elderly person who needs social welfare management, a patient, or so on.

When the management applicant is a student, a teacher may be the user, and when the management applicant is an elderly person or a patient, a social worker or a medical institution manager may be the user.

The sensor includes a current sensor, a gas sensor, a camera sensor, an illumination sensor, a heat sensor, a water pressure sensor, a flow amount sensor, and so on, and a value detected by a sensor related to a management behavior of the management applicant may be inputted to the system server 100.

The applicant terminal receives a behavior performed by the management applicant in a manner such as a touch and transmits the behavior to the system server 100.

Accordingly, the system server 100 may pattern a behavior of an applicant by using the behavior inputted to the sensors and the applicant terminal in real time.

In this regard, detailed description will be made while describing the configuration of the system server 100 below.

Figure 2:
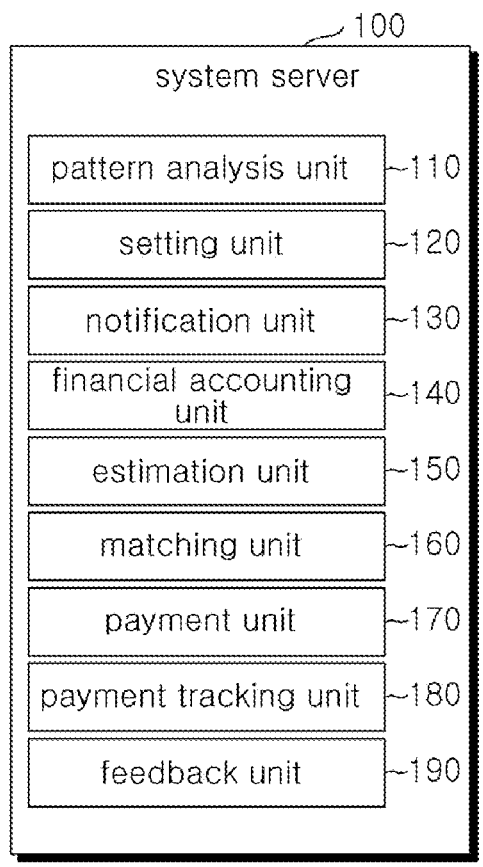
FIG. 2 is a block diagram showing a configuration of a system server according to the present disclosure.

Next, referring to FIG. 2, the system server 100 may include a pattern analysis unit 110, a setting unit 120, a notification unit 130, and a financial accounting unit 140, and may further include an estimation unit 150, a matching unit 160, a payment unit 170, a payment tracking unit 180, and a feedback unit 190.

The pattern analysis unit 110 may perform analysis to be patterned in connection with the user-behavior measurement unit 10 and the applicant-only behavior measurement unit 20 and may check a cycle for each behavior by converting behavior measurement values received for a certain period of time from the sensor, the user terminal, and the applicant terminal into data.

The setting unit 120 may automatically or manually set expense (fee) for each behavior and may individually set the expense for each user in relation to a user's work type according to a cycle for each behavior checked by the pattern analysis unit 110 and may individually set the expense for each management applicant in relation to a management type requested by the management applicant.

That is, the expense for each behavior received from a manager through the manager terminal 30 may be automatically set according to the cycle for each behavior checked by the pattern analysis unit 110, or the cycle for each behavior checked by the pattern analysis unit 110 may be manually set by being transmitted to the manager terminal 30 and being received from the manager through the manager terminal 30.

When values measured by the user-behavior measurement unit 10 and the applicant-only behavior measurement unit 20 do not match a set value of the setting unit 120, the notification unit 130 notifies the user terminal, the applicant terminal, and the manager terminal 30 of the behaviors of the user and the management applicant.

At this time, a confirmation procedure for the notification may be performed, and when completion of the confirmation is not recognized by the user terminal, the applicant terminal, and the manager terminal 30, the user-behavior measurement unit 10 and the applicant-only behavior measurement unit 20 may perform measurement again, and when the unmatching is continued, a terminal of an institution that performs checking off-line may identify the site in order to determine the cause, and the result may be transmitted to the manager terminal 30.

When the values are matched immediately after remeasurement, it is determined t as an error, that is, a sensor or a terminal may have a reception error, and thus, only when there is unmatching twice or more, a terminal of an institution that performs checking off-line may identify the site in order to determine the cause, and the result may be transmitted to the manager terminal 30.

The financial accounting unit 140 may process the expense according to a user's behavior and transmit expense processing information to the manager terminal 30 or the user terminal.

That is, the financial accounting unit 140 is an artificial intelligence type financial accounting system that performs expense processing based on behaviors inputted to a sensor, a user terminal, or an applicant terminal, and data compared with a set value set by the setting unit 120.

The financial accounting unit 140 will be described below with an example.

The system server 100 according to the present disclosure may further include the estimation unit 150 which extracts predicted estimation before being matched with a user by measuring a behavior of a management applicant by the applicant-only behavior measurement unit 20 for a certain period of time and transmits the predicted estimation to the manager terminal 30 and the applicant terminal.

That is, when the management applicant transmits management request information to the manager terminal 30 by using the applicant terminal, the applicant-only behavior measurement unit 20 may analyze a behavior of a management applicant for a certain period or time by using the pattern analysis unit 110 and extract predicted expense according thereto, and the management applicant previously knows the expense before being connected to the user and may consider whether or not to proceed the connection.

The system server 100 according to the present disclosure may further include the matching unit 160 that compares and connects a behavior pattern of the user and a behavior pattern of the management applicant with each other, which are collected by measuring the behaviors of the user and the management applicant by using the user-behavior measurement unit 10 and the applicant-only behavior measurement unit 20, respectively.

That is, when the management applicant sees the predicted expense transmitted from the estimation unit 150 and permits management to proceed through the applicant terminal, the manager terminal 30 receives the permission and may check information on a user whose behavior pattern matches the management applicant to connect the information to the management applicant.

Information of the matched management applicant may be transmitted to the user terminal, and information of the matched user may be transmitted to the applicant terminal, and thus, the user and management applicant may check the information.

Accordingly, a real-time behavior of the matched management applicant may also be transmitted to the user terminal in real time, and a state of the management applicant may be checked by the notification unit 130.

The system server 100 according to the present disclosure may further include the payment unit 170, and when payment information on a payment card registered by a user is inputted to the payment unit 170, the payment unit 170 converts the payment information into data and converts the data to the manager terminal 30.

For example, in a case in which a user is a social worker related to a management applicant, when a payment card used to pay for expense for a management application list generated based on a behavior pattern of the management applicant is registered and items corresponding to the management application list are purchased, usage details are converted into data, and the data is transmitted to the manager terminal 30.

That is, a manager may check at a glance whether or not the purchased items corresponding to the management application list are correct and may generate expense processing information in connection with the financial accounting unit 140.

The system server 100 according to the present disclosure may further include the payment tracking unit 180, and the payment tracking unit 180 prevent abuse of payment, and when payment is made by a user connected to a management applicant, that is, when payment information on a payment card registered by the user connected to the management applicant is inputted, the payment tracking unit 180 may compare a behavior pattern of the management applicant measured by an applicant-only behavior pattern unit with a behavior pattern of the user measured by a user-behavior pattern unit, thereby preventing abuse.

That is, when comparing a management application list generated based on the behavior pattern of the management applicant with the behavior pattern of the user measured by the user-behavior pattern unit, the payment tracking unit 180 may detect a case in which payment is made for an unmatched item in the card usage details, thereby preventing abuse.

In addition, when payment is made by a user who is not connected to the management applicant, that is, when payment information on a payment card registered by a user who is not connected to the management applicant is inputted, the payment tracking unit 180 may compare the behavior pattern of the user measured and collected by the user-behavior pattern unit with the behavior pattern of the user at the time of payment, thereby may determine abuse.

That is, by comparing with the behavior pattern of the user measured according to the user's work type, it is possible to detect a case in which an unmatched item is paid among the card usage details, and thus, abuse may be checked.

The system server 100 according to the present disclosure may further include the feedback unit 190, and when payment abuse is detected by the payment tracking unit 180, the feedback unit 190 transmits the abuse usage details to the manager terminal 30, receives action information from the manager terminal 30, and transmits the action information to a user terminal.

That is, a manager who confirms abuse usage details may take action in stages according to the abused expense, and, for example, the manager may determine a reason and a size of the expense by stages such as a fine type, a reduction type, and a recommended resignation type, and transmit action information to the user terminal.

Next, an example of utilization of a management system using behavior pattern recognition according to an embodiment of the present disclosure described above will be described with reference to FIGS. 3 to 19.

Figure 3:
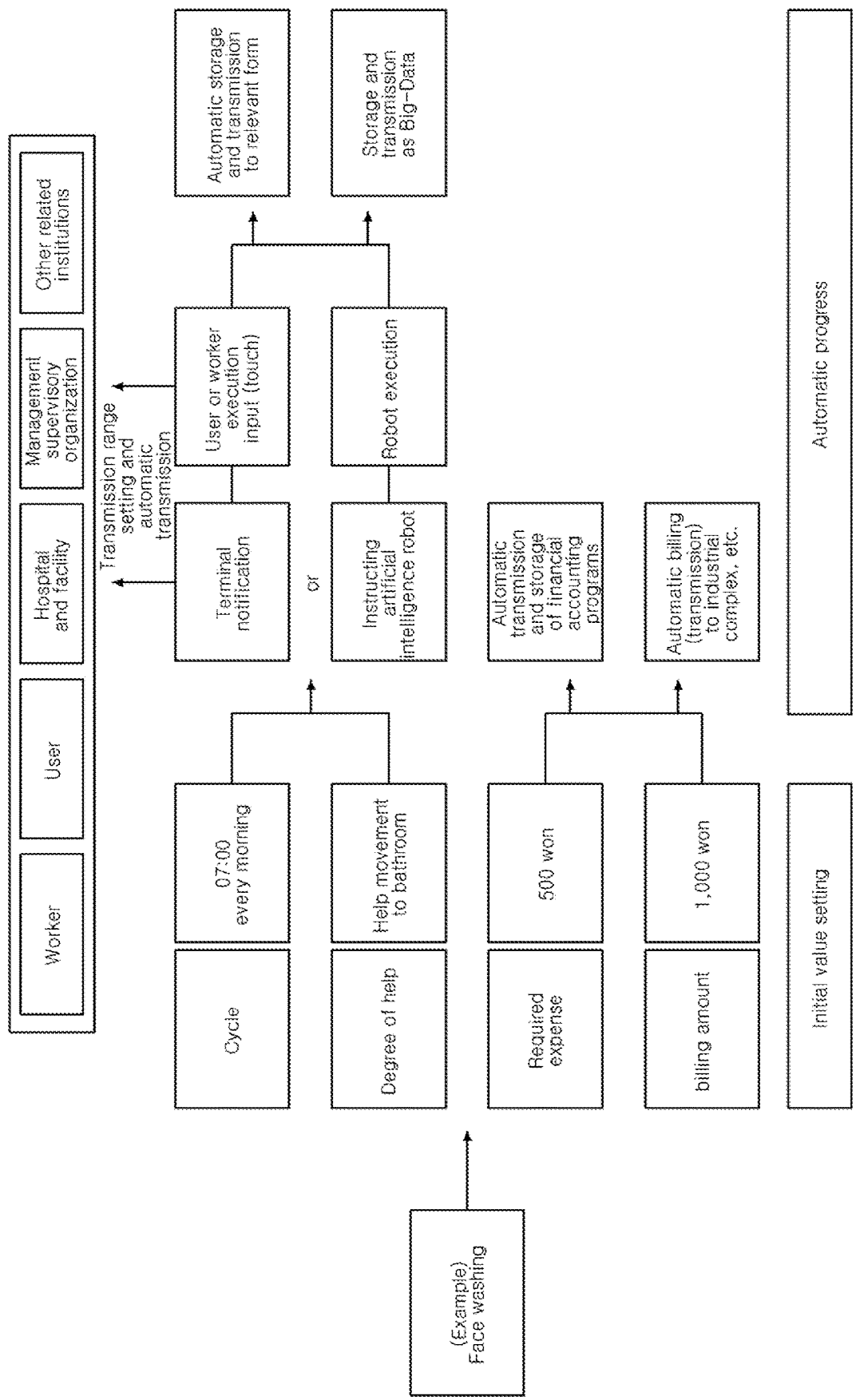
FIGS. 3 to 21 are diagrams showing examples in which the management system using behavior pattern recognition is applied according to an embodiment of the present disclosure.

Referring to FIG. 3, the present disclosure assumes that all social welfare facilities or medical institutions are connected to each other in a regulation (instruction), a document (formula), a work process, job description, and a job procedure (work plan and daily log), and so on. That is, because all behaviors (works) performed by the institutions have to be recorded, behaviors and records have close business relevance.

Behaviors of the institutions are largely divided into four categories: general administration, workers, users, and financial accounting, and most of the detailed behaviors according thereto are given a certain cycle. That is, a date when workers have to receive a salary, a time when a target person has to receive a specific service (behavior) necessary therefor, and so on may correspond thereto.

For example, when a worker enters a company or a target person joins the army, only various types of information related to the worker or the target person are inputted initially, and when only a work cycle determined by an institution is set, works to be performed are automatically generated to be displayed on a system screen on relevant day, week, month, quarter, half year, year, and time of that day. As described above, the generated works are largely composed of four types: general administration, workers, users, and financial accounting (expense).

Because a person in charge that performs the behavior, a user, a management supervisory organization, matters related to delegation decision, and so on are initially designated, each behavior may be transmitted only to the person in charge or the user through a notification function.

First, when the present disclosure is applied to general administration, the general administration is largely divided into 12 types: institutional installation; temporary closure of business; closure of business, facility evaluation management, operation (personnel) committee, property management (investigation of property, carrying-in of sponsored fixtures, purchase of fixtures), management of consumables (carrying-in of sponsored consumables, purchases of consumables), delegation decision, and sponsorship; management of volunteers, safety management (facility safety management, disaster training), disaster and emergency response, vehicle management; pick-up service; bathing service, record management, and other works; and so on. Each of the items is further classified in detail, and the behaviors are processed according to a procedure (sequence). The items will be described separately as follows in connection with the present disclosure.

Institutional installation; temporary closure of business, closure of business a. When an institution installation button is pressed, behaviors to be performed according to the type of the institution are automatically generated and displayed, and additional behaviors according thereto are automatically generated. In addition, when additional behaviors are required, information thereon is provided.

b. Respective behaviors are automatically stored and managed in a formula and a Big-Data type as soon as the behaviors are performed.

c. Respective behaviors are automatically transmitted to the person who has rights to approve through an electronic approval function to be managed.

d. When all behaviors are completed, the behaviors are transmitted to relevant city, county, district, and so on through automatic storage and transmission function, and the city, county, district, and so on may also communicate remotely and interactively and perform management.

e. The same is applied to temporary closure of business and closure of business.

Figure 4:
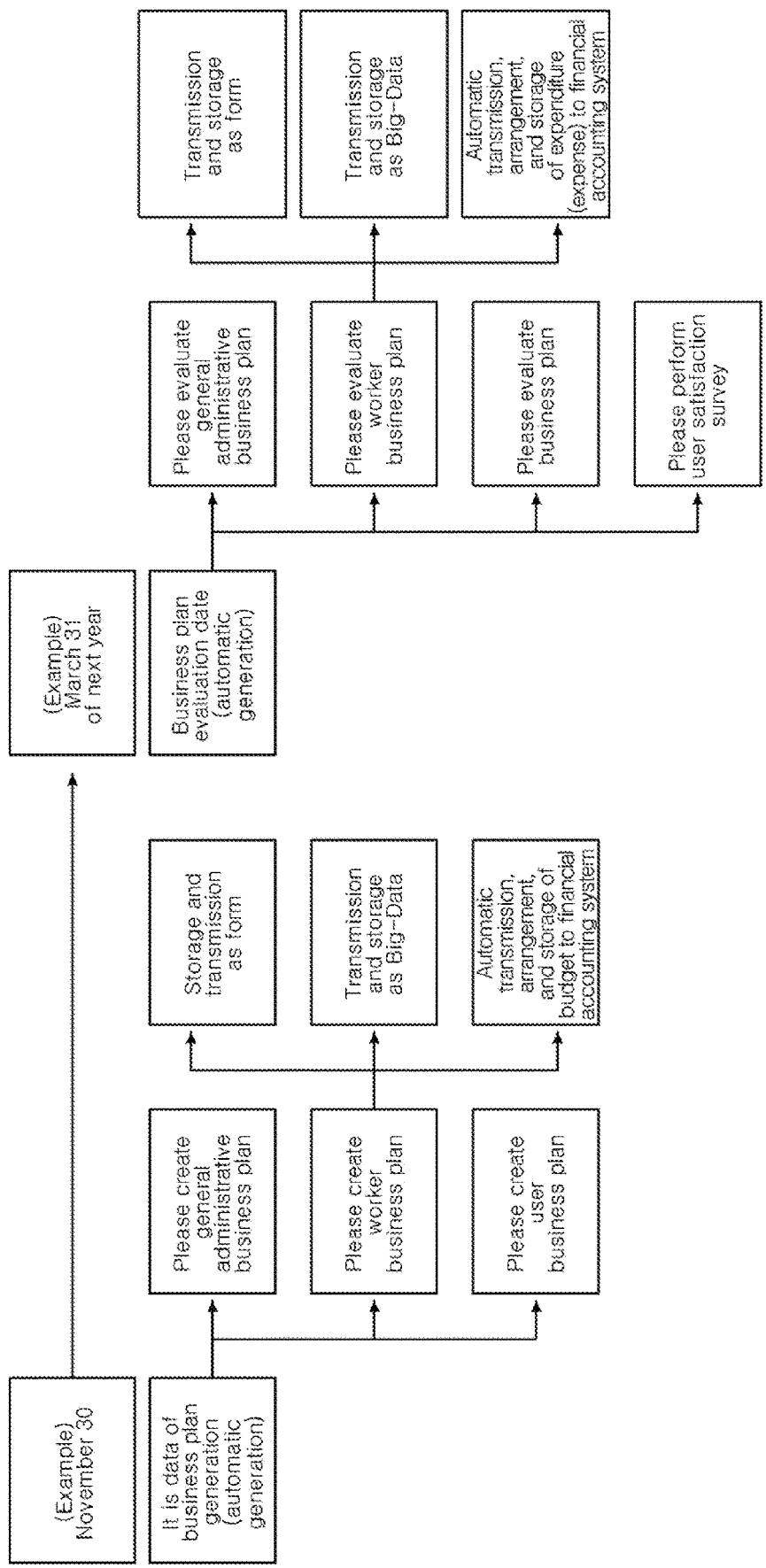

Referring to FIG. 4, when the same is applied to business plan establishment and facility evaluation management:

a. Behaviors related to (annual) business plan establishment are automatically generated and instructed when date and time initially set by an institution are reached.

b. A budget required for the business plan establishment is automatically transmitted to and arranged in relevant department, item, and section of a financial accounting system only by writing the budget to a business plan.

c. During the business plan establishment, items (content) that have to be included in works or plans of the relevant institution are also automatically generated. That is, the items refer to matters included in an evaluation indicator and so on suggested by the government in addition to a basic business plan.

d. Documents related to works are automatically generated such that facility evaluation is performed according to a cycle, a date, and a time initially set by the institution.

e. When the works are completed, the works are automatically arranged in a list of documents to be submitted to local governments and so on, and whether or not to submit the documents are automatically asked when a corresponding date is reached.

f. Meanwhile, when an activity image, a video, or so on is captured by using a mobile phone, a smart camera, or so on, the captured activity image or video is automatically transmitted to be arranged in a relevant document. The same is applied below.

g. After review of a person in charge, the captured activity image or video is automatically transmitted to relevant city, county, district, or so on through a transmission function along with an electronic approval function, and the city, county, district, or so on may also communicate remotely and interactively and perform management.

h. The data is automatically stored and managed in two types of a formula and a Big-Data type. The same is applied below.

Figure 5:
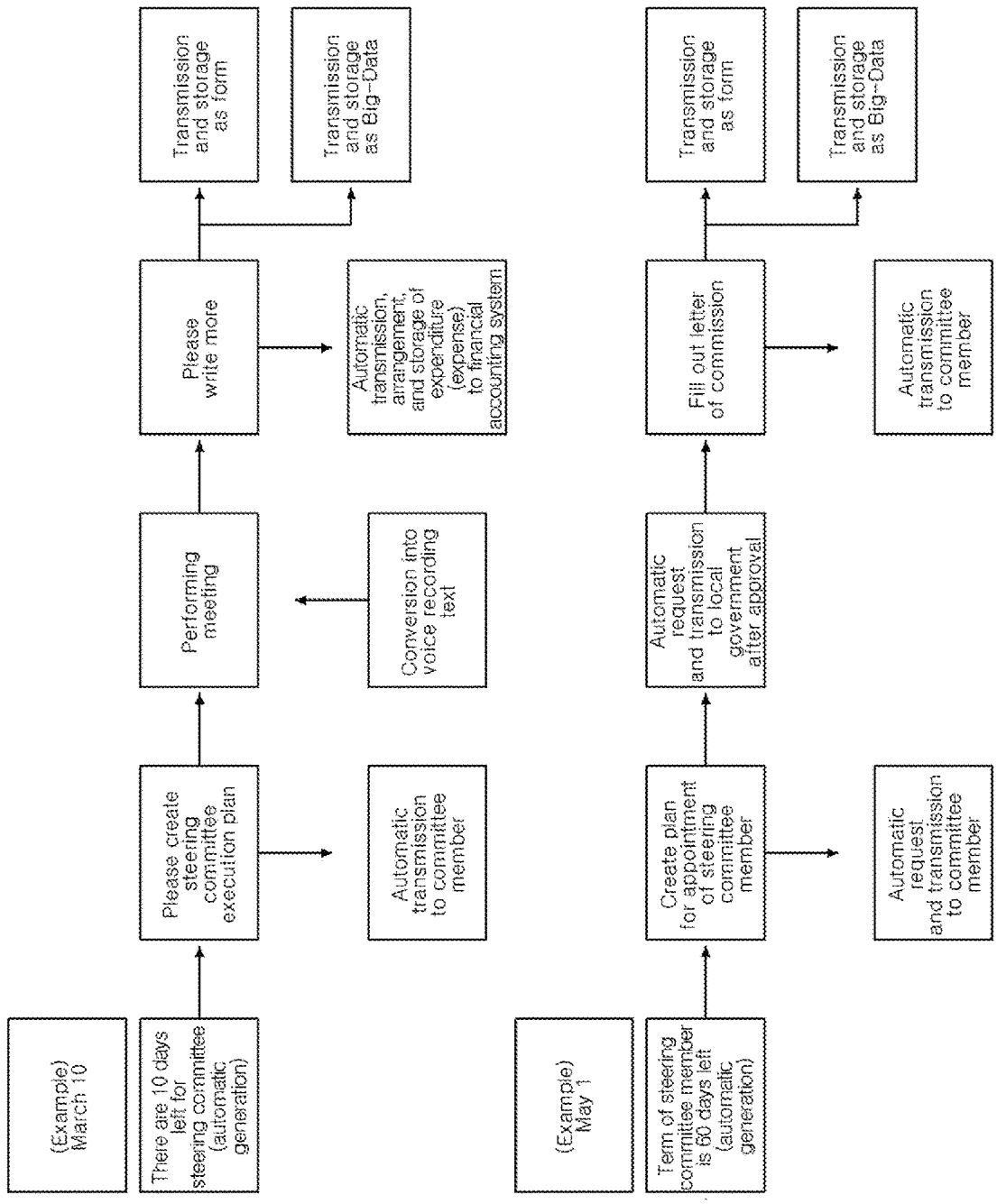

Referring to FIG. 5, when applied to the operation (personnel) committee:

a. Content of convening of a steering committee and an implementation plan, and behaviors to be performed are automatically generated, when the date and time initially set by an institution are reached.

b. Meanwhile, in a case in which a new worker to be described below enters a new company, leaves the company, has a reason for dismissal, and so on, when only initial information thereon is inputted, whether or not a personnel committee is required and necessary documents are automatically generated and displayed.

c. At this time, a message (notification) is automatically generated and displayed to check whether matters related to an appointment report, configuration of the steering (personnel) committee, a list of members, or so on comply with laws or regulations of a relevant institution.

d. After a document is completed, the document is transmitted by a transmission method such as an e-mail, a text message, or so on of a relevant member through an automatic transmission function.

e. When an activity image and so on related thereto are captured, the activity image and so on are automatically transmitted to be arranged in a relevant document. The same is applied below.

f. Conference content may be automatically recorded through a smartphone, an artificial intelligence speaker, and so on, and the content is converted into a document and automatically arranged in a relevant document.

g. After the committee is closed, additional documents related thereto are automatically generated. In addition, when expenses incurred in relation to the committee are written or the automatic transmission function of card usage details is used, the expenses are automatically transmitted to and arranged in relevant department, item, and section of a financial accounting system. The same is applied below.

h. After review of a person in charge, the document is automatically transmitted to relevant city, county, district, or so on through a transmission function along with an electronic approval function, and the city, county, district, or so on may also communicate remotely and interactively and perform management.

i. The data is automatically stored and managed in two types of a formula and a Big-Data type. The same is applied below.

Figure 6:
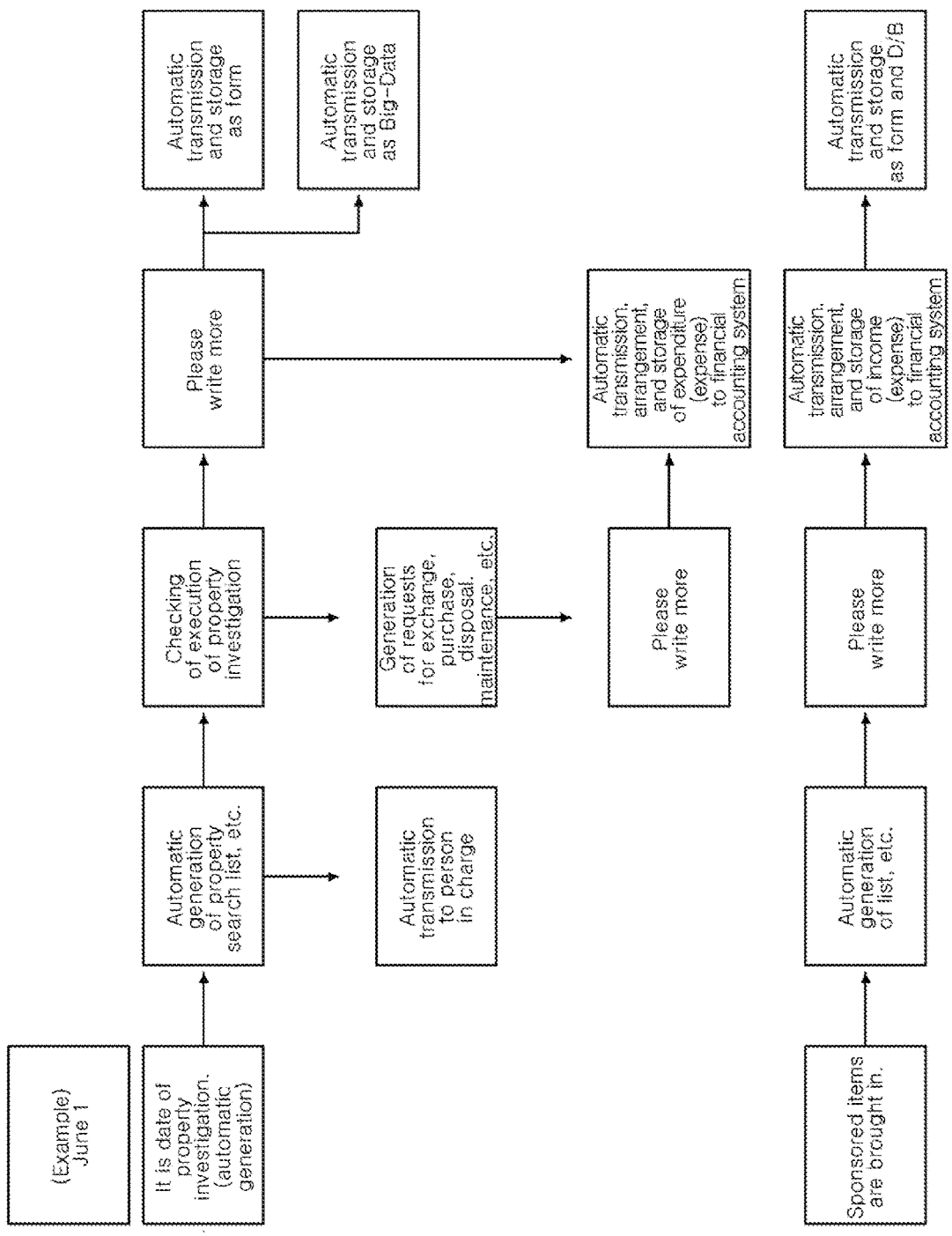

Referring to FIG. 6, when applied to property management:

a. The present disclosure related to property investigation consists of two things of property investigation and carrying-in of sponsored fixtures.

b. When the date and time initially set by an institution are reached, behaviors related to a property investigation implementation plan, an initial investigation list, content, a fixture list to be investigated, and so on are automatically generated.

c. When a user checks and touches the investigation list, the content, the fixture to be investigated, and so on which are automatically generated on a terminal such as a mobile phone, the data is automatically transmitted and arranged in relevant documents.

d. After the investigation is completed, a relevant document may be automatically generated and checked, and when required expenses are written or the automatic transmission function of card usage details is used, the data is automatically transmitted to and arranged in relevant department, item, and section of a financial accounting system. The same is applied below.

e. The document is automatically transmitted to relevant city, county, district, or so on through a transmission function along with an electronic approval function, and the city, county, district, or so on may also communicate remotely and interactively and perform management.

f. The data is automatically stored and managed in two types of a formula and a Big-Data type. The same is applied below.

Figure 7:
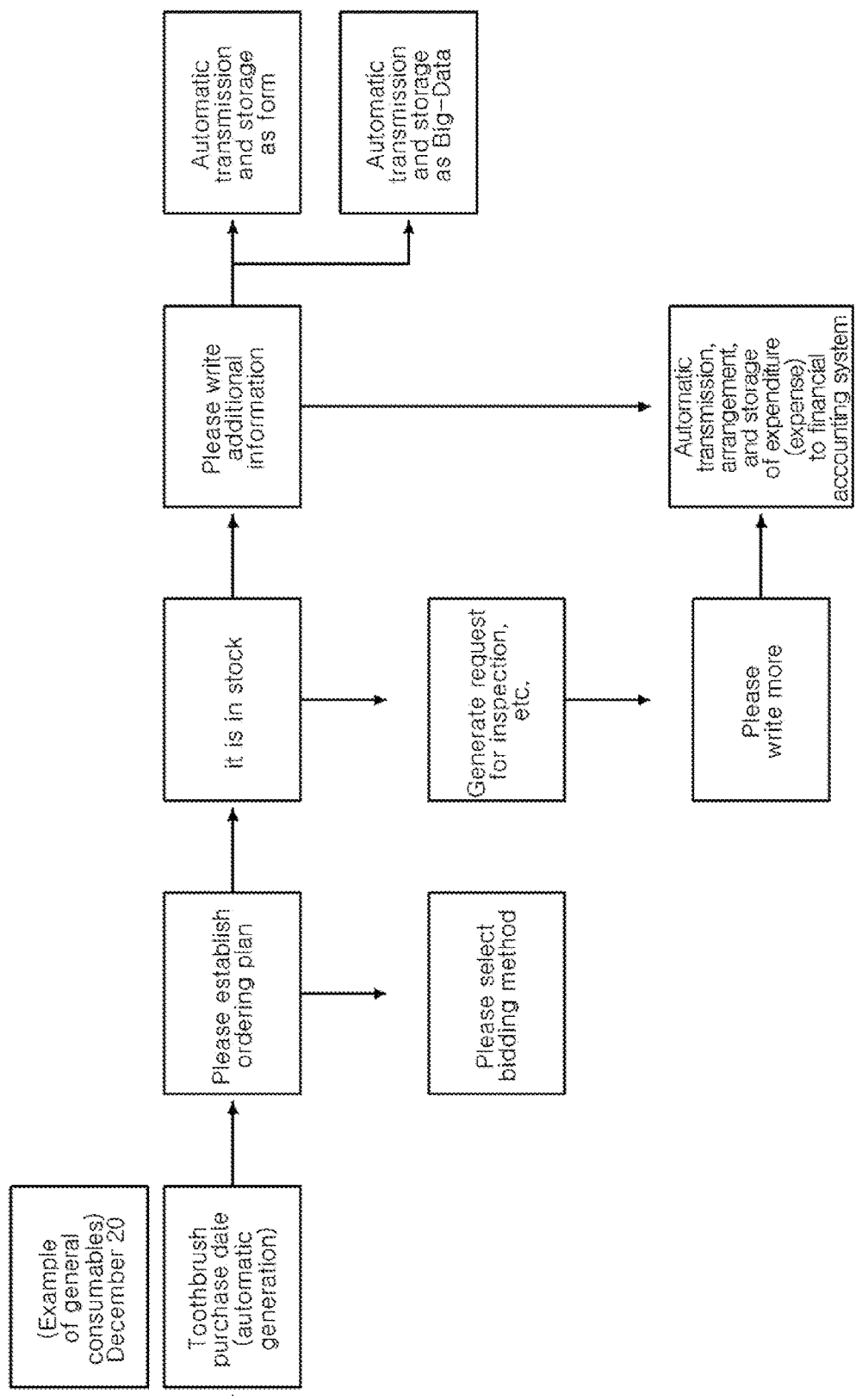
Figure 8:
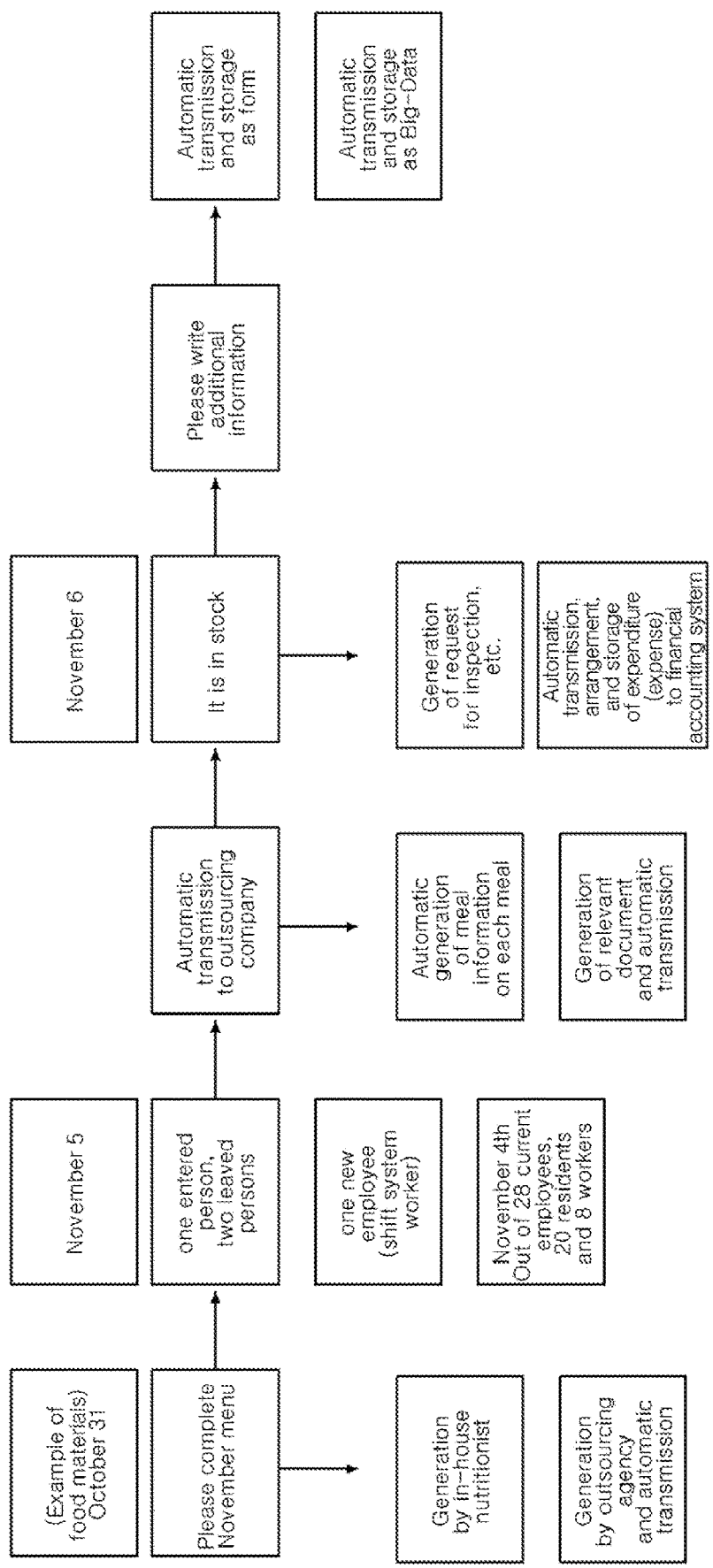
Figure 9:
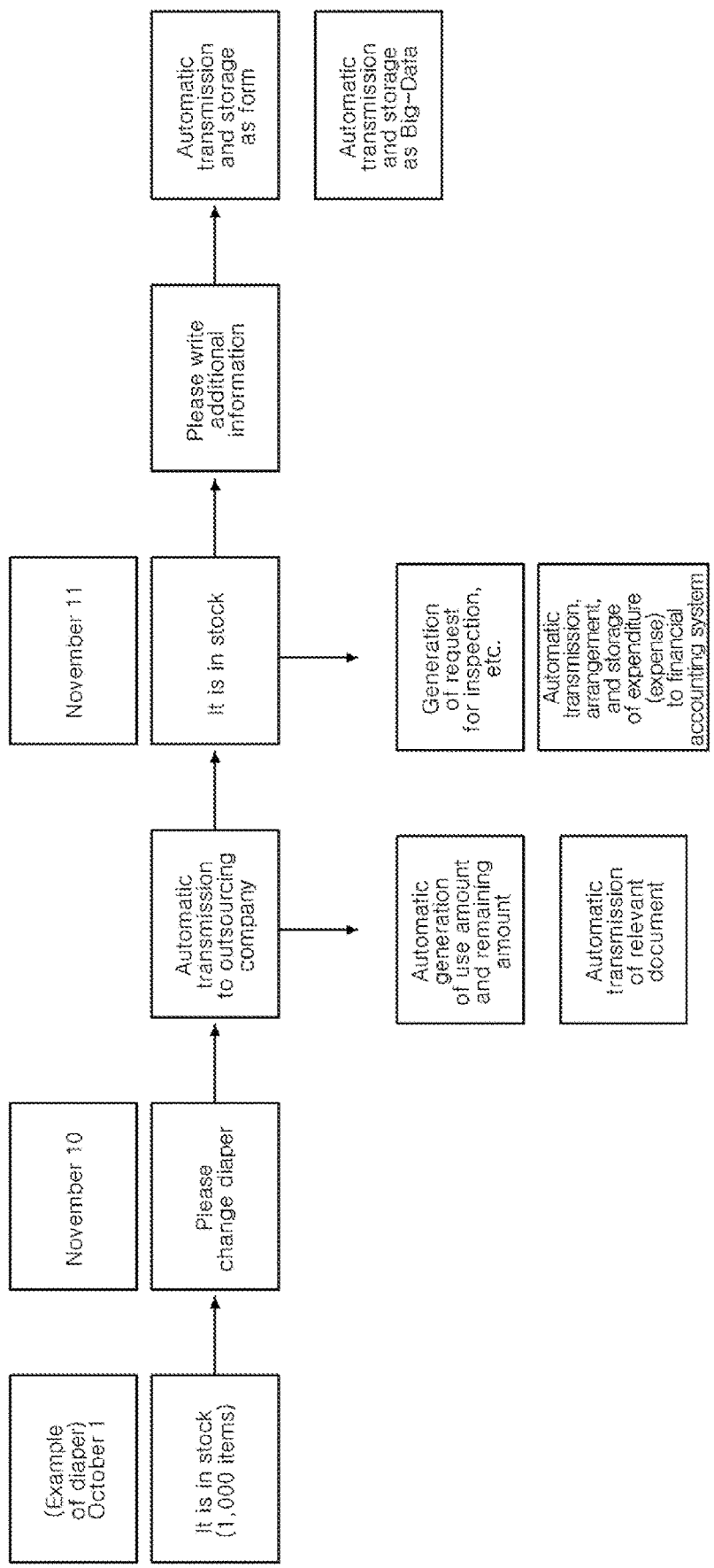

Referring to FIGS. 7 to 9, when applied to management of consumables:

a. Details and documents related to purchase of consumables are automatically generated when reaching the date and time initially set by an institution are reached. However, food materials, diapers, injection drugs, drugs, and so on operate in a separate process as follows.

b. Food materials are connected to following workers and a user system. That is, the number of workers who work every day and every hour, and the number of users who enter facilities or hospitals are automatically managed and are remotely managed through a program connected to an institution that provides the food materials. A menu may be prepared by both a dietitian of a relevant institution or a dietitian of a food supply institution. Either way, because the menu, the amount of food materials, drinking water, and so on are automatically managed according to the specified date and time such as the day and the next day, a delivery institution rather than a purchase institution may perform automatic ordering through a reverse ordering system. At this time, relevant documents may also be prepared by the supply institution and may be automatically transmitted to the purchase institution.

c. When using the automatic transmission function of card usage details, data is automatically transmitted to and arranged in relevant department, item, or section of a financial accounting system. The same is applied below. In addition, the data is automatically transmitted to relevant city, county, district, or so on through a transmission function along with an electronic approval function, and the city, county, district, or so on may also communicate remotely and interactively and perform management.

d. Consumables, which may be quantified, such as diapers, syringes, and drugs are connected to a user system. That is, when it is inputted that a diaper is changed according to an automatically generated diaper change instruction through a mobile phone or so on, content thereof is transmitted to a diaper management system along with a document related thereto. The transmitted content is remotely managed through a program connected to a supply agency such that a received amount, a required amount, and a residual amount are automatically measured, and the same process as food materials is performed.

e. The data is automatically stored and managed in two types of a formula and a Big-Data type. The same is applied below.

f. Consumables other than food materials and diapers are automatically managed by processes other than the reverse ordering system.

Figure 10:
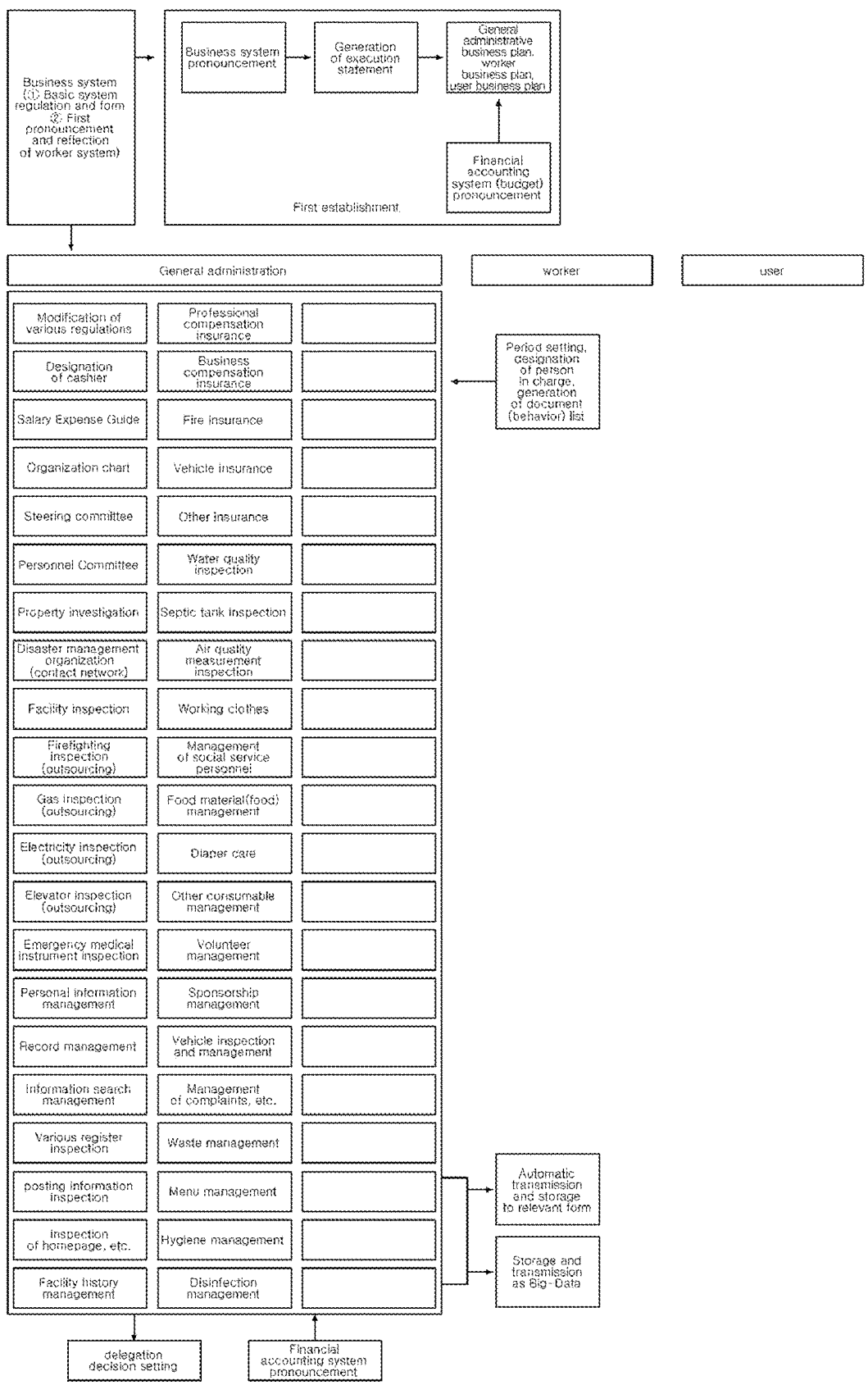

Referring to FIG. 10, when applied to sponsorship and volunteer management; safety management (facility safety management, disaster training), disaster and emergency response, vehicle management; pickup service; bathing service, record management, and other works.

a. The above-described works are also performed by the method described above or by a similar method.

Figure 11:
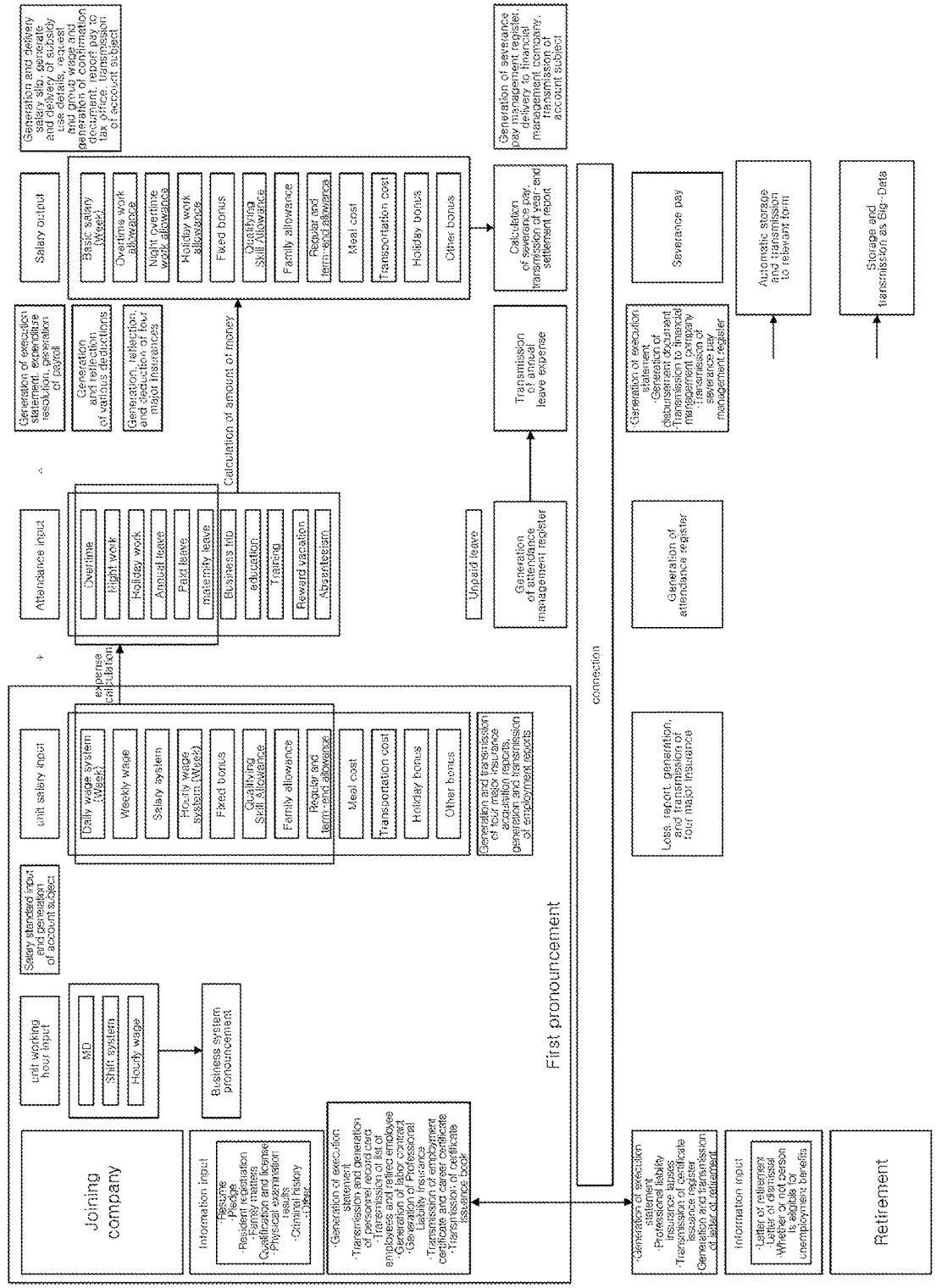
Figure 12:
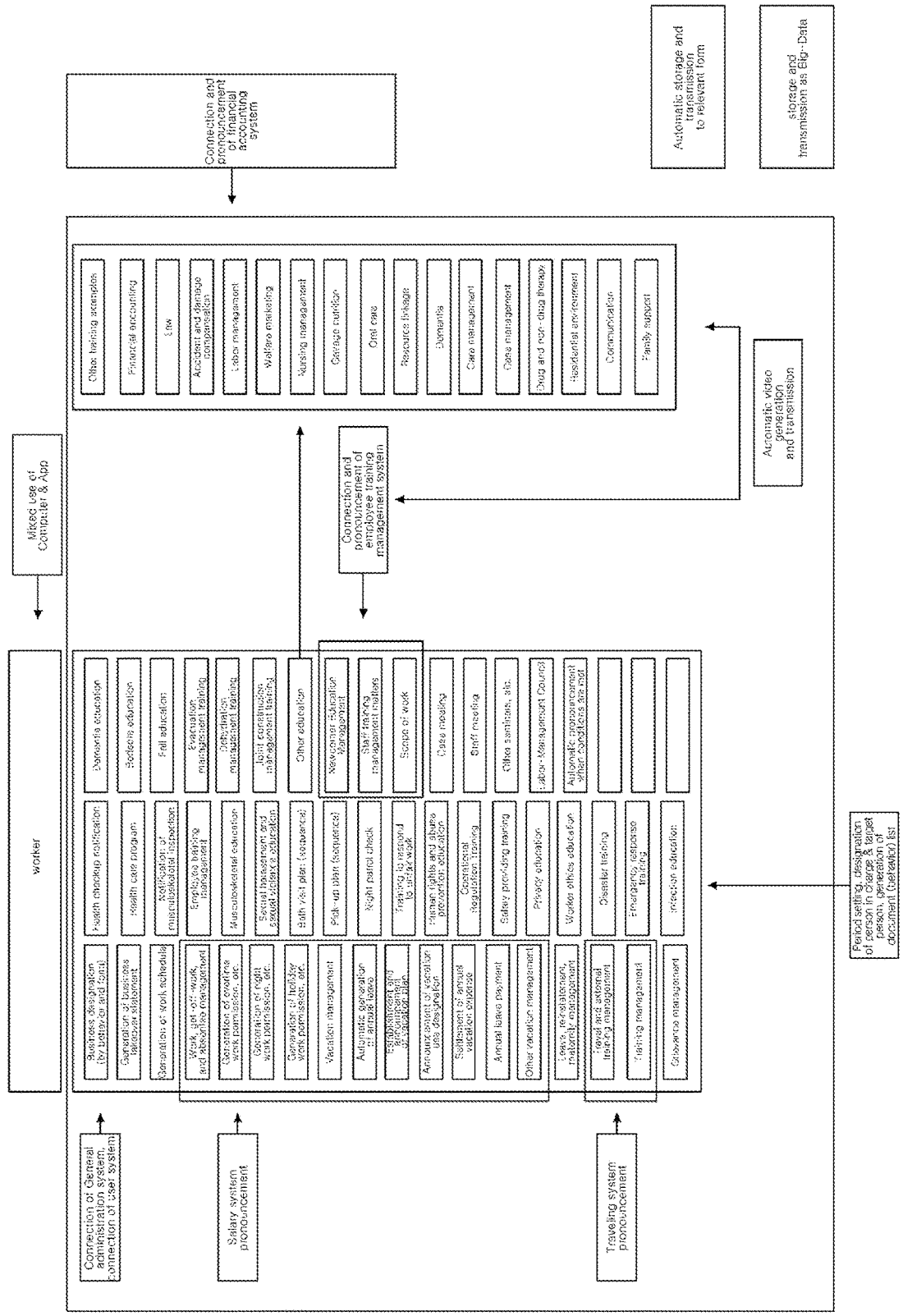
Figure 13:
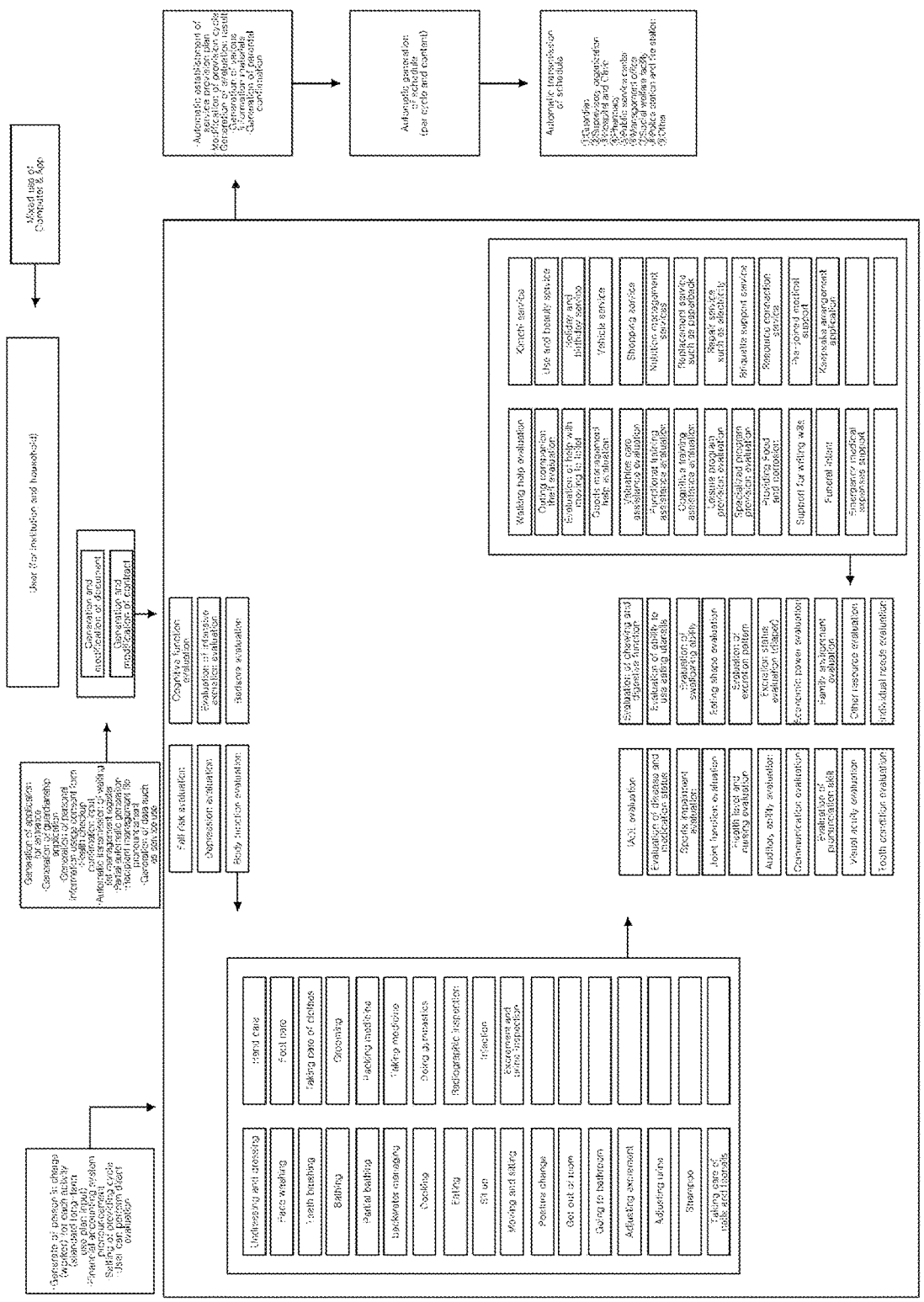
Figure 14:
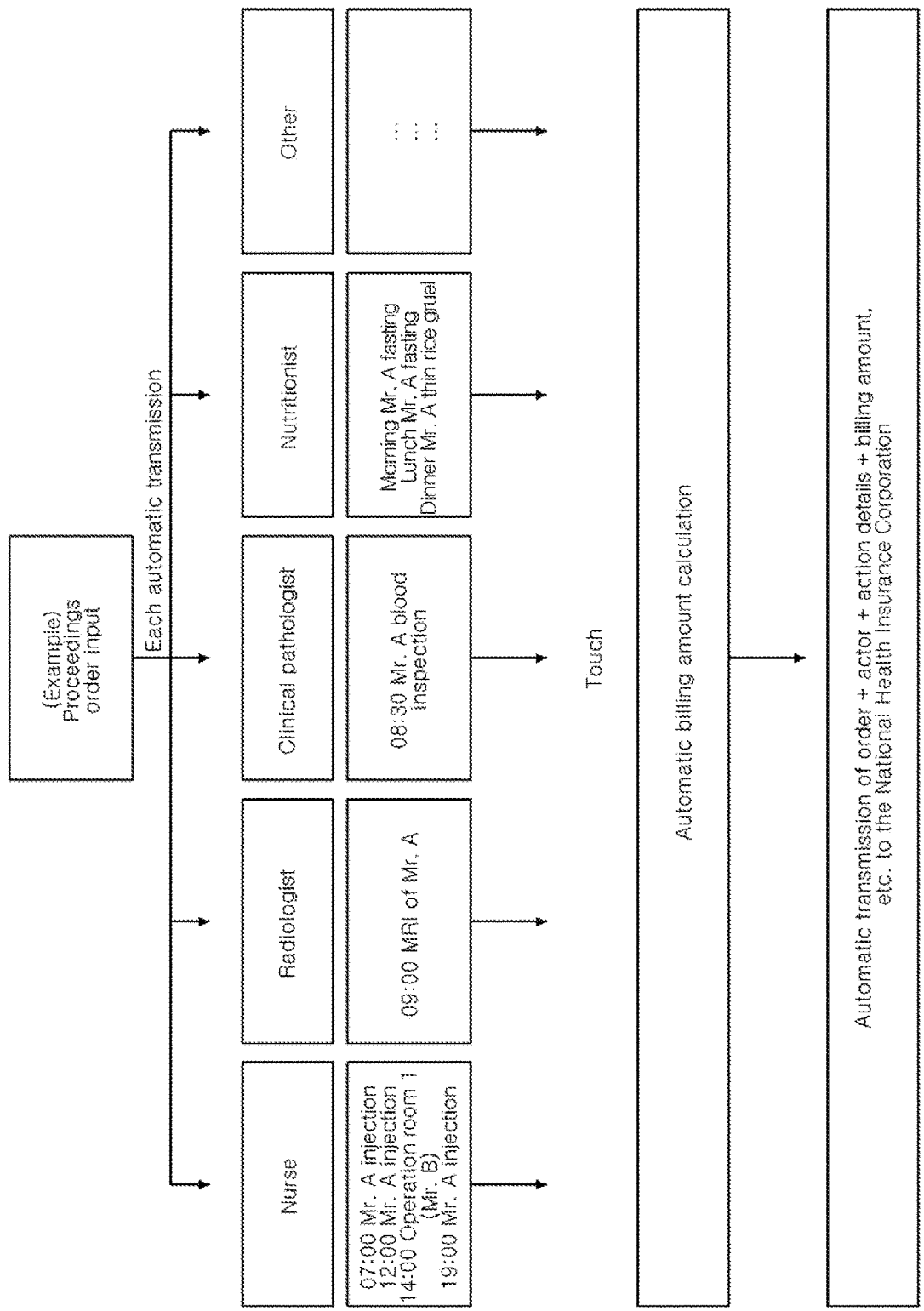
Figure 15:
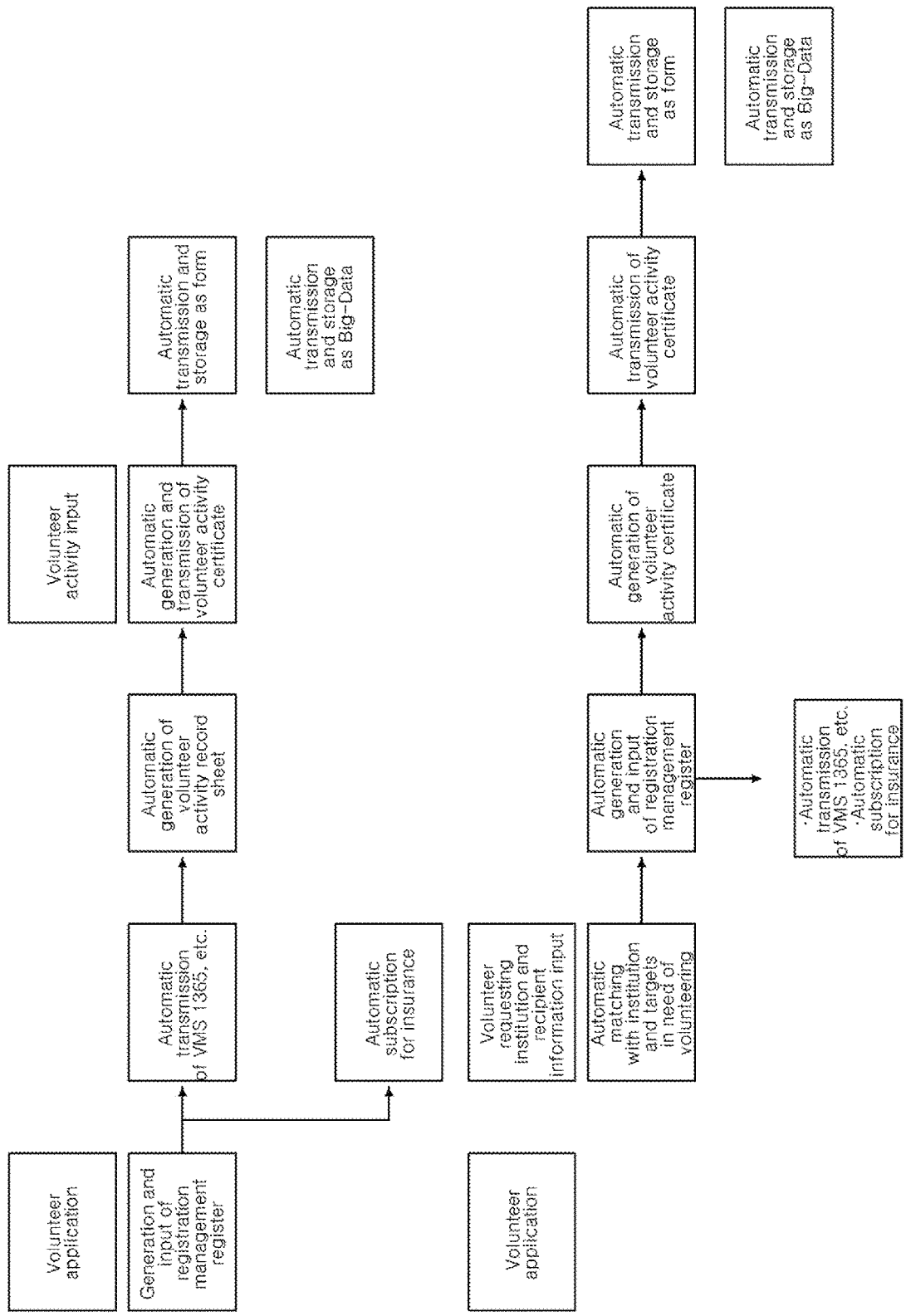
Figure 16:
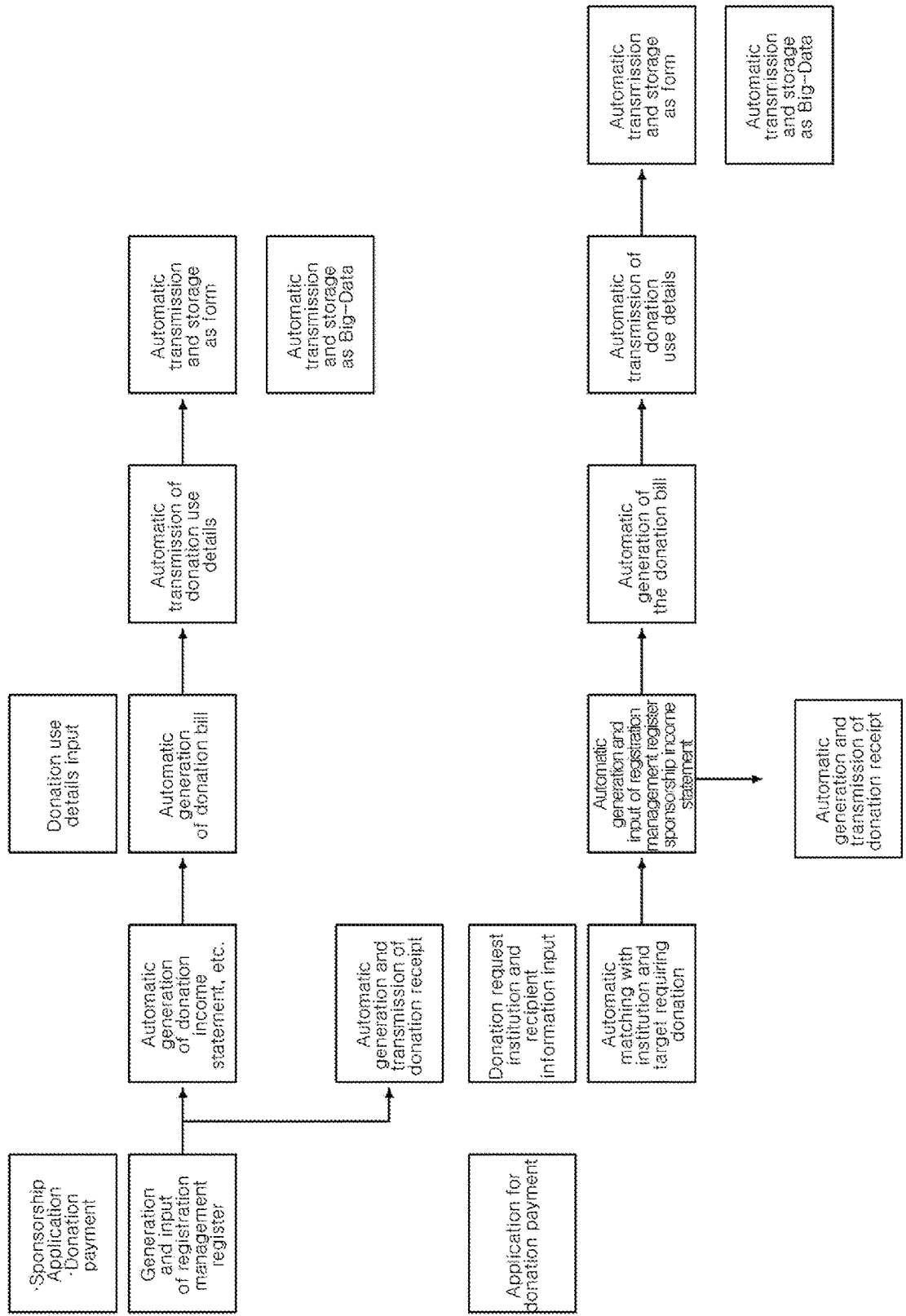
Figure 17:
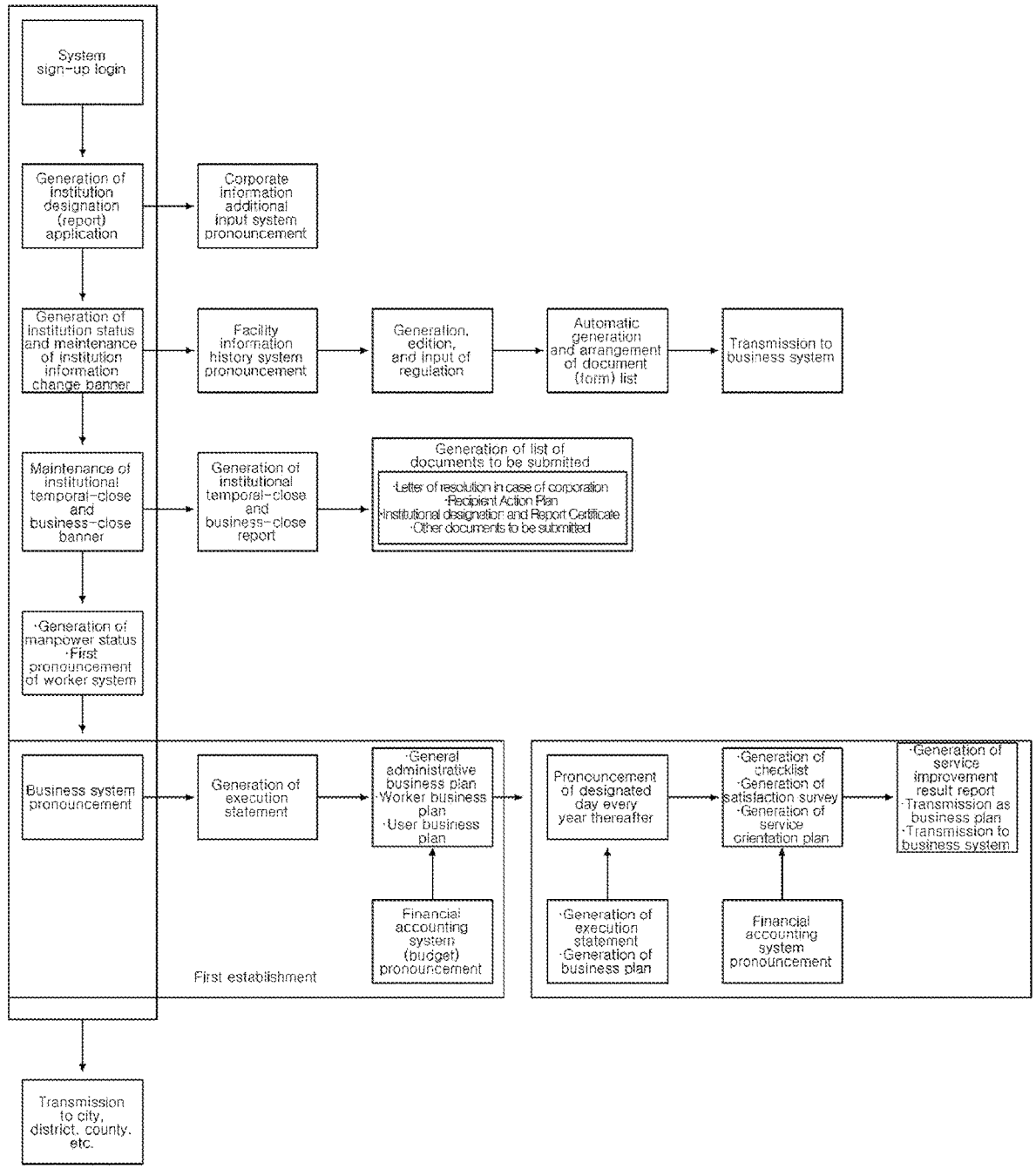
Figure 18:
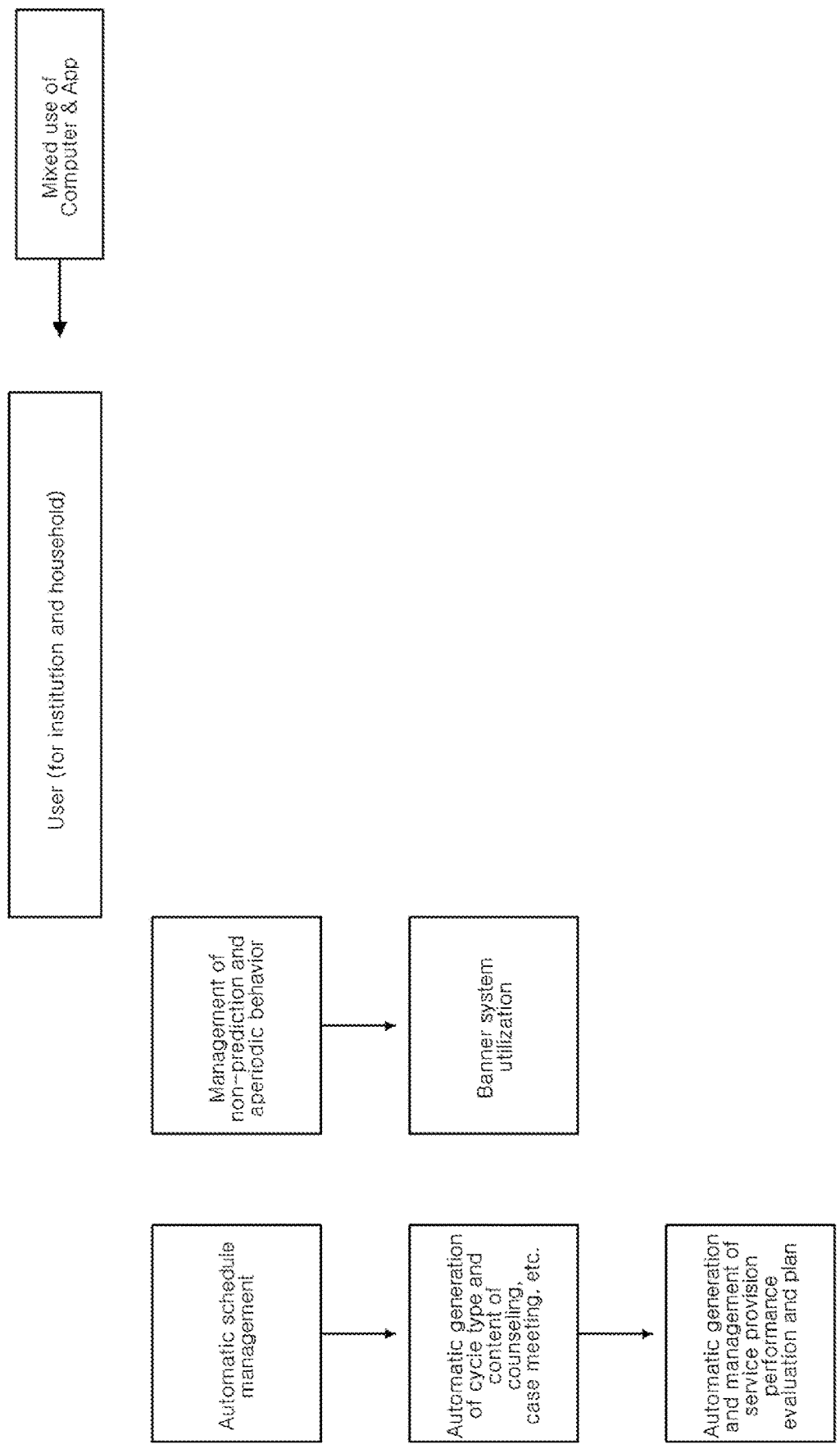
Figure 19:
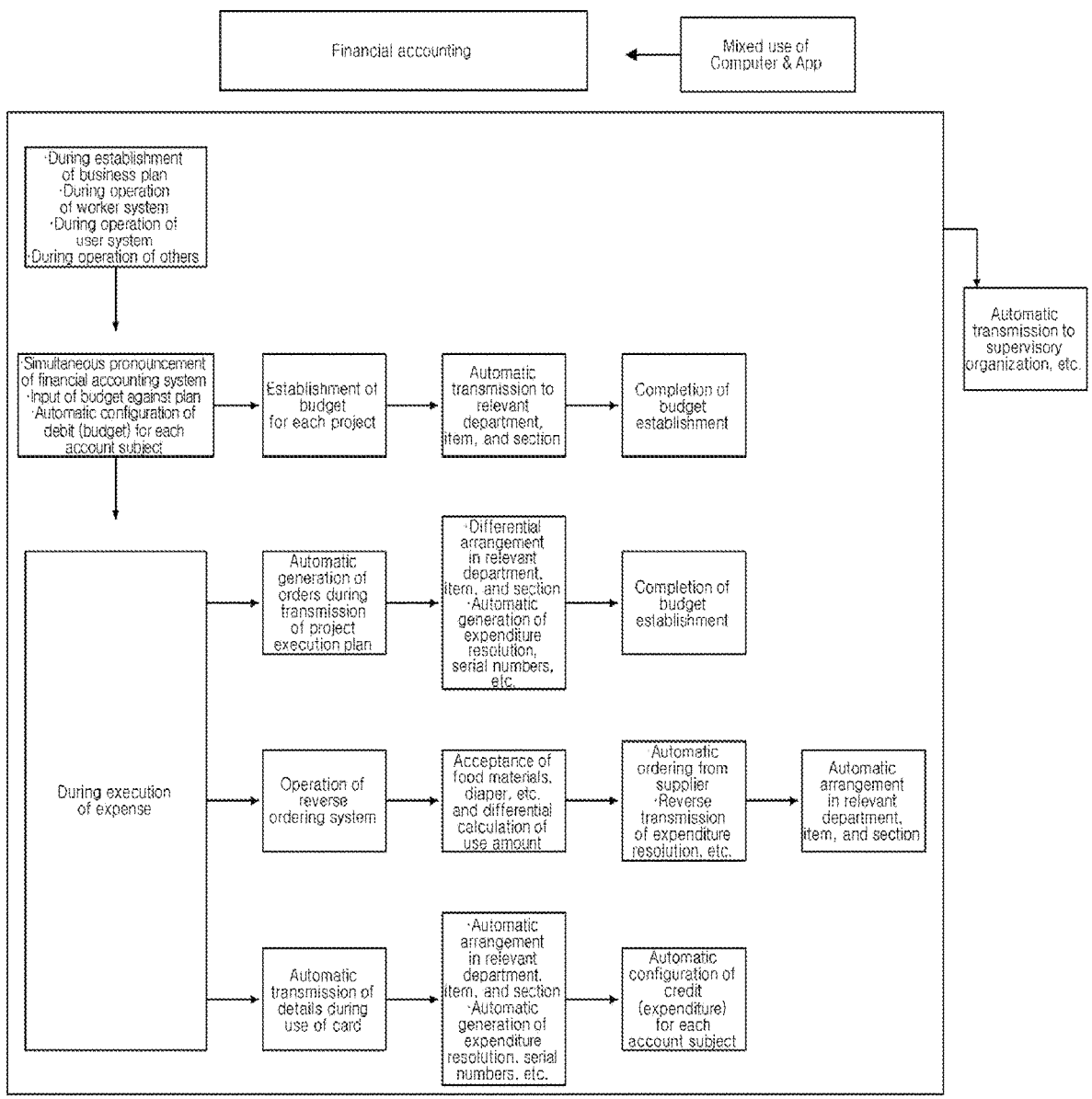
Figure 20:
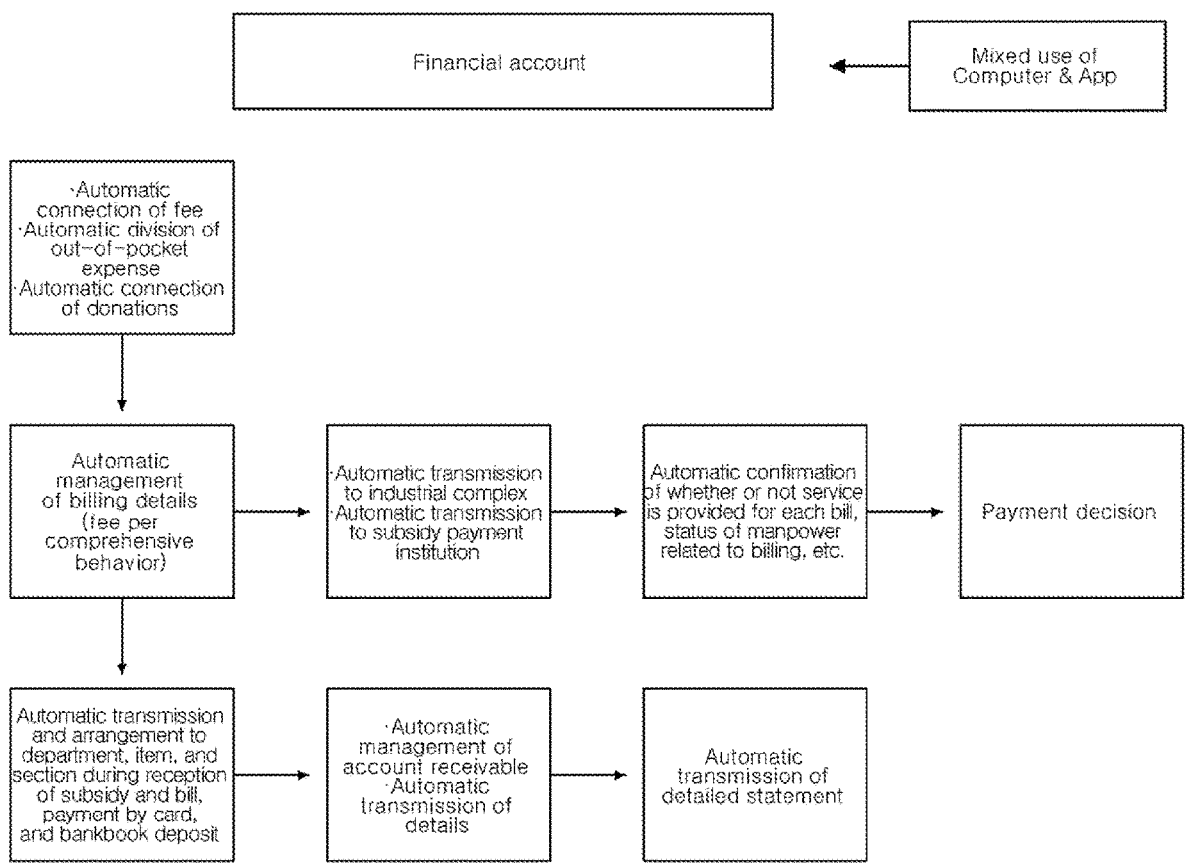
Figure 21:
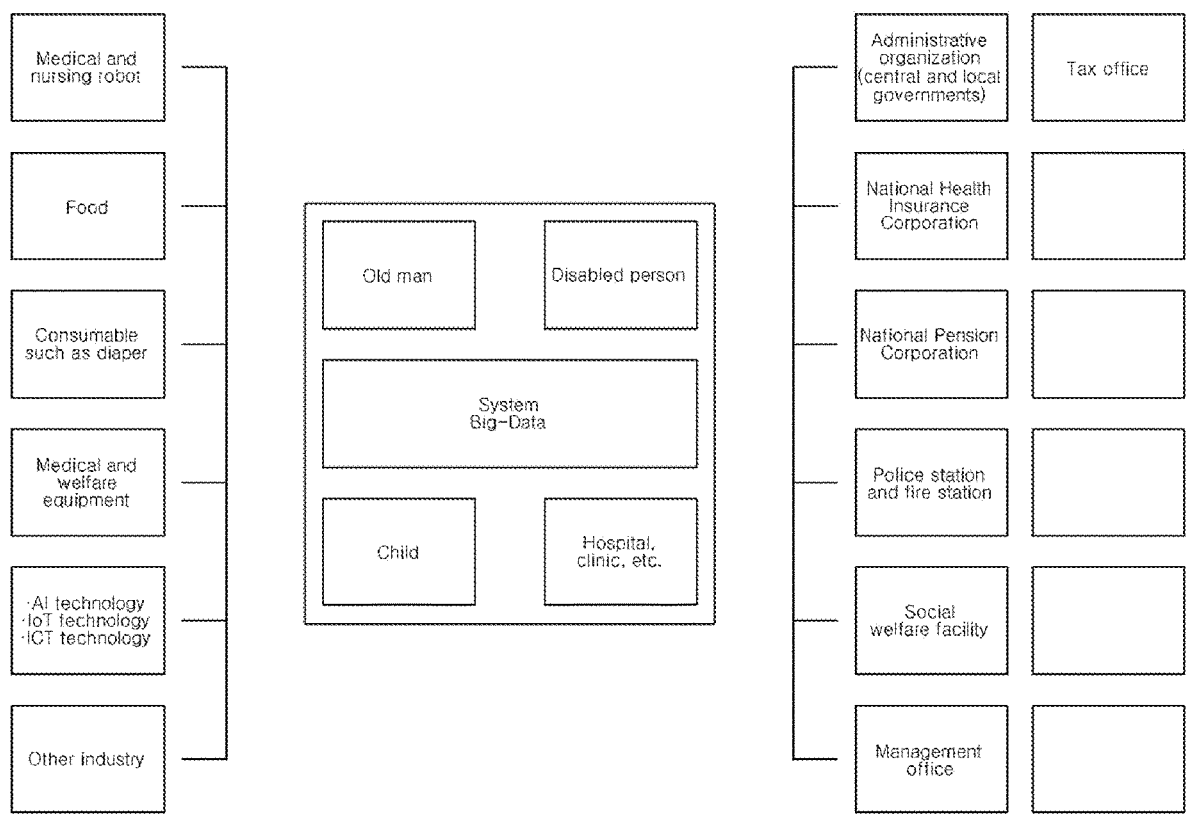

Referring to FIGS. 11 and 12, when applied to workers:

A system related to workers consists of eight types such as recruitment and labor contract, resignation; dismissal, division of work, salary payment management (salary, severance pay), time attendance management (time and attendance, vacation, leave of absence), grievance handling, education, employment rules, and labor-management committee. Each of the works are further classified in detail and the behaviors are processed according to a procedure (sequence). The present disclosure related to the works is basically the same or similar to the general administration system, and all are automated and proceed in the following order.

A performer only has to make performance according to a behavior indicated by the present system. That is, according to the present system, it is possible to accurately set a type, content, and a cycle, and so on of works that each person in charge has to perform in a relevant institution (a hospital, a social welfare facility, or so on), and thus, not only standardization of institutional affairs but also individualization of services for users are possible. As such, even when the relevant institution does not separately check or confirm a behavior to be performed by a human head, works to be done by the institution or a person in charge is automatically generated and managed by the present system.

Accordingly, there is no need to worry about who will do the work while each person in charge works (behaviors), and problems such as duplication and avoidance of work may be solved.

In addition, the present disclosure is designed, predicted, and progressed based on behavior (activity), and thus, the present disclosure is essentially different from the conventional program based on a format.

In addition, the present disclosure focuses on a behavior, and thus, a program, contents, educational contents, information, behavior support, and so on may be installed in methods such as broadcast, video, Internet of Things (IoT), machine-to-machine (M2M), robot, and so on, for each behavior.

Referring to FIGS. 13 to 16, when applied to a user:

When a user decides to use an institution such as a hospital or a social welfare facility, a relevant formula is automatically generated and displayed.

When a person in charge collects and stores initial information of a user, a cycle, a degree of help, a required expense, a billing expense, and so on are automatically connected for each behavior as shown in FIG. 3.

For example, when a doctor sets an injection time, a medication time, a type and content and an execution time of inspection, a type and content and time of surgery, and a surgery participant in relation to a patient in a hospital, data related thereto is automatically transmitted to a person in charge according to the time. The same is applied to a social welfare facility.

The present disclosure is also applied to a user living at home. That is, for example, when a doctor prescribes medication, a patient at home is automatically notified of the prescription in time, and when the patient transmits medication information through a terminal, the transmitted medication information is transmitted to a terminal of the doctor again and is managed by the terminal. At this time, management of the terminal follows a Risk-Management method, and thus, when medication is done, information thereon is managed in an M2M manner, and only when the medication is not done, the doctor is notified thereof.

In addition, according to the present disclosure, it is possible to design a life schedule for a user at home by a worker or so on, or the user may also design the life schedule by himself/herself. That is, it is possible to set most of daily routines including a wake-up time, a mealtime, a medication time, a brushing time, a toilet-use time, a service provider (worker) visit time, a hospital visit time, a going-out time, and so on.

In addition, when the routine is set, the present system automatically manages users since then. However, the present system is based on Risk-Management, and the reason is to minimize invasion of a user's privacy. That is, when there is no change in water consumption, electricity consumption, and gas consumption even though the wake-up time set by the present system elapses, information related thereto is immediately transmitted to an institution, which is connected to the present system, such as an apartment management office.

For example, a cognitive function test (MMSE-K, MMSE-DS, or so on) is also performed and managed at regular intervals by an artificial intelligence speaker or so on, and when a cognitive function is reduced below a range set by the present system, a relevant institution is notified thereof. The number of behaviors is currently approximately 185, and some of the behaviors are shown in Table 1.

TABLE 1

| Classification | Service content | Record form |
|---|---|---|
| (a) hair washing | ① Preparing and arranging necessary items ② Assisting movement to washroom and assisting movement of wheelchair | |
| | ③ Washing hair and watching for hair drying ④ Washing hair, hair drying, and so on | |
| (b) face washing | ① Preparing and arranging necessary items ② Assisting movement to washroom and assisting movement of wheelchair | |
| | ③ Watching for face washing ④ Teaching wash operation ⑤ Washing face, neck, and hand | |
| (c) body cleansing | ① Preparing and arranging necessary items ② watching for wash of hand and foot, runny nose, tears, perineum, and so on | |
| | ③ Teaching body cleaning ④ Cleaning body | |
| (d) oral care | ① Preparing and arranging necessary items ② Watching for teeth brushing ③ Teaching teeth brushing operation ④ Mouth cleaning such as teeth brushing (gargle solution and water) and denture trimming | |
| (e) bath | ① Preparing and arranging bathing items ② Assisting movement to bathhouse and- assisting movement of wheelchair | |
| | ③ Watching for shower and bathing ④ Operating and teaching bathing tools ⑤ Washing body | |
| (f) clothes changing | ① Preparing and arranging clothes ② Watching ③ Teaching ④ Changing underwear ⑤ Changing outer clothes | |
| (g) grooming | ① Preparing and arranging necessary items ② Watching for nail and toenail clipping, shaving, hairdressing, makeup, and so on ③ teaching grooming ④ Helping grooming | |
| (h) cooking | ① Preparing and arranging necessary items ② Assisting movement to kitchen and assisting movement of wheelchair ③ Watching for cooking ④ Teaching cooking ⑤ cooking | |
| (i) Meal and tube feeding | ① Preparing meals and arranging ② Assisting movement to restaurant and assisting movement of wheelchair and eating on bed ③ Watching for meals (snack) ④ Helping for meals (snack) ⑤ Tube feeding and nutritional nursing | |
| | ① General meal ② Liquid meal (porridge) ③ Diabetes meal ④ Tube feeding | |
| (j) Physical function training | | |
| (k) movement (walking) | ① Preparing movement assisting tool and arranging ② Watching for movement and walking ③ Helping for movement and walking | |

TABLE 1-continued

| Classification | Service content | Record form |
|---|---|---|
| ⓛ Going out and accompanying | ① Accompanying to hospital (use and unuse of vehicle) ② Accompanying to bank and government office (use and unuse of car) ③ Helping for walking ④ work agency When using vehicle ① Recipient (guardian) vehicle ② Nursing care worker vehicle ③ Institution vehicle ④ Others | |
| ⓜ Arrangement and management of surroundings | ① Arranging items and watching for management ② Arranging items and teaching management ③ Helping for management of bed, linen, environment, and items ④ Helping and managing laundry ⑤ Help for cleaning ⑥ Managing valuables and money | |
| ⓝ excretion | ① Preparing and arranging necessary items ② Assisting movement to bathroom and assisting movement of wheelchair ③ Watching ④ Helping for excretion and disposal ⑤ Helping for diaper change When helping excretion ① Use of toilet ② Use of movable toilet seat ③ Use of diaper | |
| ⓞ bedsore and posture change | | |

When a worker or a social worker is scheduled to visit a home, a time, a reason, and so on for the visit are notified to not only a user but also the worker and a management supervisory institution at the same time, and when the worker or the social worker visits the home, the visit may be immediately confirmed by a location-based system.

That is, information on the visit is automatically transmitted to desirable institutions such as a worker, a service provider, a user, a user guardian, an administrative supervisory agency, a fire station, a police station, an apartment management office, a relevant social welfare facility, an electricity corporation (Korea Electric Power Corporation), and a gas corporation.

The transmitted behaviors may be received through various terminals such as a mobile phone, home automation, an artificial intelligence speaker, a smart TV, a robot, and a computer.

A user (a recipient or a guardian) may confirm results of various types of desire investigation and a service plan established according thereto through a mobile phone or a computer and may also request a service change or an opinion. In addition, the user may confirm a service provision plan for the day generated and transmitted by the system and service details provided by using a mobile phone or a computer and may request an opinion thereon.

When a user wants, the user may be pre-registered at relevant institutions including a dementia relief center, a hospital, a clinic, a pharmacy, a police station, a 119-rescue center, and so on without any separate procedure and may be managed by the institutions and may be shared with a supplier or administration. That is, the user may present an opinion and may be managed by the relevant institutions including the supplier and the dementia relief center.

FIGS. 17 to 21 are brief overviews of content of the application examples described above, and detailed description thereof is omitted.

The users shown in FIGS. 3 to 21 correspond to a management applicant of the present disclosure, and the worker may correspond to a manager or a user.

The above-described embodiments according to the present disclosure are not implemented only by an apparatus and/or a method and may be implemented by a program for realizing functions corresponding to configurations of the embodiments according to the present disclosure, a recording medium in which the program is recorded, and so on. In addition, such implementation may be easily implemented by an expert in the technical field to which the present disclosure belongs from the description of the above-described embodiments.

Although the embodiments according to the present disclosure are described in detail above, the scope of the present disclosure is not limited thereto, and various modifications and improvements by those skilled in the art using the basic concept of the present disclosure defined in the following claims also fall within the scope of the present disclosure.

The invention claimed is:

1. A management system using behavior pattern recognition, comprising:
 a user-behavior measurement unit configured to continuously detect a behavior of a user;
 a system server connected to the user-behavior measurement unit and configured to generate behavior pattern information of the user by analyzing and patterning the behavior of the user;
 a manager terminal configured to receive and monitor the behavior pattern information of the user generated by the system server; and
 an applicant-only behavior measurement unit configured to detect a behavior of a management applicant that applies for management in connection with the user,
 wherein the user is a worker,
 wherein the user-behavior measurement unit receives the behavior of the user from a user-behavior measurement unit sensor or a user-behavior measurement user terminal,
 wherein the applicant-only behavior measurement unit receives the behavior of the user from an applicant-only behavior measurement sensor or an applicant-only behavior measurement unit terminal, and
 wherein the system server comprises:
 a pattern analysis unit configured to perform analysis of the behavior to be patterned, the behavior being detected by the user behavior measurement unit and the applicant-only behavior measurement unit;
 a setting unit configured to automatically set an expense for each behavior of the user based on a work type of the user according to a cycle for each behavior of the user checked by the pattern analysis unit and configured to automatically set an expense for each behavior of the management applicant based on a management type of the management applicant;

a notification unit configured to notify the user terminal, the applicant terminal, and the manager terminal of the behaviors of the user and the management applicant when values measured by the user-behavior measurement unit and the applicant-only behavior measurement unit do not match a set value of the setting unit in order to determine cause of failure to match the set value; and a financial accounting unit configured to process the expense according to the behavior of the user and transmit expense processing information to the manager terminal or the user terminal upon detection of the values measured by user-behavior measurement unit and the applicant-only behavior measurement unit matching the set value of the setting unit.

2. The management system of claim 1, wherein the system server further comprises an estimation unit configured to extract a predicted estimation before matching the management applicant with the user by measuring the behavior of the management applicant for a certain period of time using the user-behavior measurement unit and to transmit the predicted estimation to the manager terminal and the applicant terminal.

3. The management system of claim 1, wherein the system server further comprises a matching unit configured to compare and connect a behavior pattern of the user and a behavior pattern of the management applicant with each other, which are collected by detecting the behaviors of the user and the management applicant using the user-behavior measurement unit and the applicant-only behavior measurement unit, respectively.

4. The management system of claim 1, wherein the system server further comprises a payment unit configured to, when payment information on a payment card registered by the user is inputted, convert the payment information into data and transmit the data to the manager terminal.

5. The management system of claim 4, wherein the system server further comprises a payment tracking unit configured to perform tracking to prevent an abuse of payment.

6. The management system of claim 5, wherein the payment tracking unit is further configured to, when the payment information on the payment card registered by the user who is connected to the management applicant is inputted, compare a behavior pattern of the management applicant measured by an applicant-only behavior pattern unit with a behavior pattern of the user measured by a user-behavior pattern unit to determine the abuse.

7. The management system of claim 5, wherein the payment tracking unit is further configured to, when the payment information on the payment card registered by the user who is not connected to the management applicant is inputted, a behavior pattern of the user measured by a user-behavior pattern unit with a behavior pattern of the user at a time of payment to determine the abuse.

8. The management system of claim 5, wherein the system server further comprises a feedback unit configured to transmit abuse details to the manager terminal when the abuse of payment is detected by the payment tracking unit and to receive action information from the manager terminal and transmit the action information to the user terminal.

9. The management system of claim 1, wherein the user-behavior measurement sensor is one of a current sensor, a gas sensor, a camera sensor, an illumination sensor, a heat sensor, a water pressure sensor, and a flow amount sensor.

10. The management system of claim 1, wherein the applicant-only behavior measurement sensor is one of a current sensor, a gas sensor, a camera sensor, an illumination sensor, a heat sensor, a water pressure sensor, and a flow amount sensor.

* * * * *